United States Patent [19]
Auestad

[11] Patent Number: 6,012,679
[45] Date of Patent: Jan. 11, 2000

[54] CONVERTIBLE SEAT SYSTEMS FOR WIDE BODY AIRCRAFT

[75] Inventor: Craig A. Auestad, Bellevue, Wash.

[73] Assignee: The Boeing Company, Seattle, Wash.

[21] Appl. No.: 09/303,220

[22] Filed: Apr. 30, 1999

Related U.S. Application Data

[62] Division of application No. 08/689,804, Aug. 14, 1996.

[51] Int. Cl.[7] .......................... B64D 11/06; A47C 15/00; A47C 7/54
[52] U.S. Cl. .................................. 244/118.6; 244/122 R; 297/411.37; 297/232
[58] Field of Search .............................. 244/118.5, 118.6, 244/122 R; 297/233, 248, 232, 411.28, 411.37

[56] References Cited

U.S. PATENT DOCUMENTS

| | | |
|---|---|---|
| 2,841,212 | 7/1958 | De Vos et al. ...................... 297/411.37 |
| 3,374,032 | 3/1968 | Del Giudice . |
| 4,019,779 | 4/1977 | Hogan . |
| 4,244,623 | 1/1981 | Hall et al. . |
| 4,533,175 | 8/1985 | Brennan . |
| 4,768,832 | 9/1988 | Wain . |
| 4,881,702 | 11/1989 | Slettebak . |
| 5,037,157 | 8/1991 | Wain et al. . |
| 5,104,065 | 4/1992 | Daharsh et al. . |
| 5,131,607 | 7/1992 | Arnold et al. . |
| 5,178,345 | 1/1993 | Peltola et al. . |
| 5,180,120 | 1/1993 | Simpson et al. . |
| 5,193,765 | 3/1993 | Simpson et al. . |
| 5,284,379 | 2/1994 | Arnold et al. . |
| 5,350,217 | 9/1994 | Kanigowski . |
| 5,529,265 | 6/1996 | Sakurai . |
| 5,553,813 | 9/1996 | Merensky . |
| 5,558,309 | 9/1996 | Marechal . |
| 5,597,139 | 1/1997 | Beroth . |
| 5,727,845 | 3/1998 | Jackson-Wynch . |
| 5,775,642 | 7/1998 | Beroth ................................. 244/118.6 |
| 5,829,836 | 11/1998 | Schumacher et al. . |

FOREIGN PATENT DOCUMENTS 0 335 018  10/1989  European Pat. Off. .

OTHER PUBLICATIONS

Lankford, "Convertible Seats: Value–Driven Added Revenue for Airlines," Speednews Conference, Mar. 1995.

O. Sutton et al., "Convertible Aircraft Seats Prove Their Worth," *Interavia*, Jul./Aug. 1995.

*Primary Examiner*—Theresa M. Wesson
*Attorney, Agent, or Firm*—Christensen O'Connor Johnson & Kindness PLLC

[57] ABSTRACT

Selected rows of seats for a wide body aircraft (i.e., having two or more passenger aisles) have seat groups that can expand or contract to change the number of seats in a row and the seat width. Conversion is possible with all seat components remaining attached to their respective frames, so that no detachable units have to be stowed. The convertible seat configurations are adaptable to incorporating individual amenities, including individual electronic displays.

20 Claims, 26 Drawing Sheets

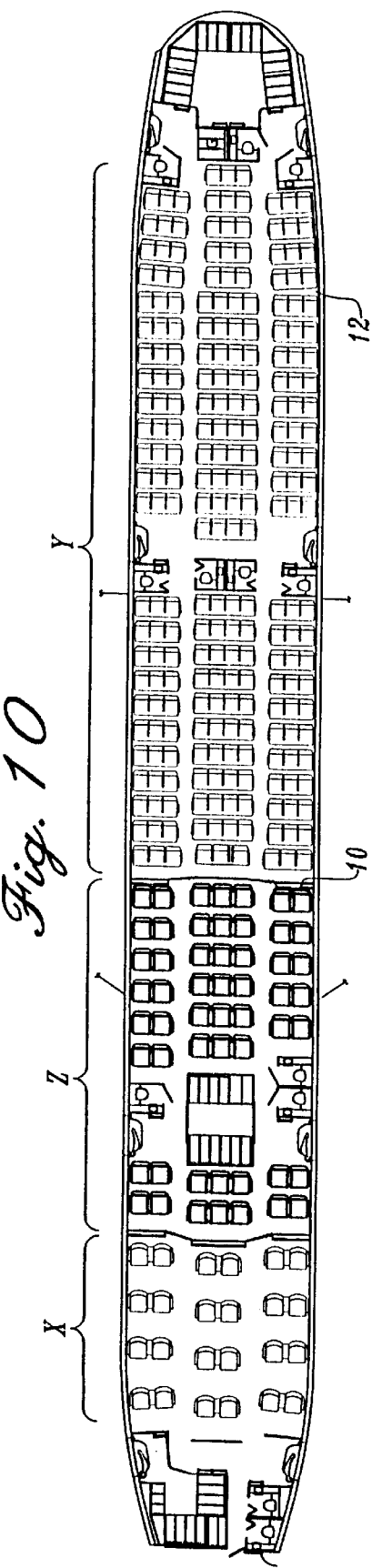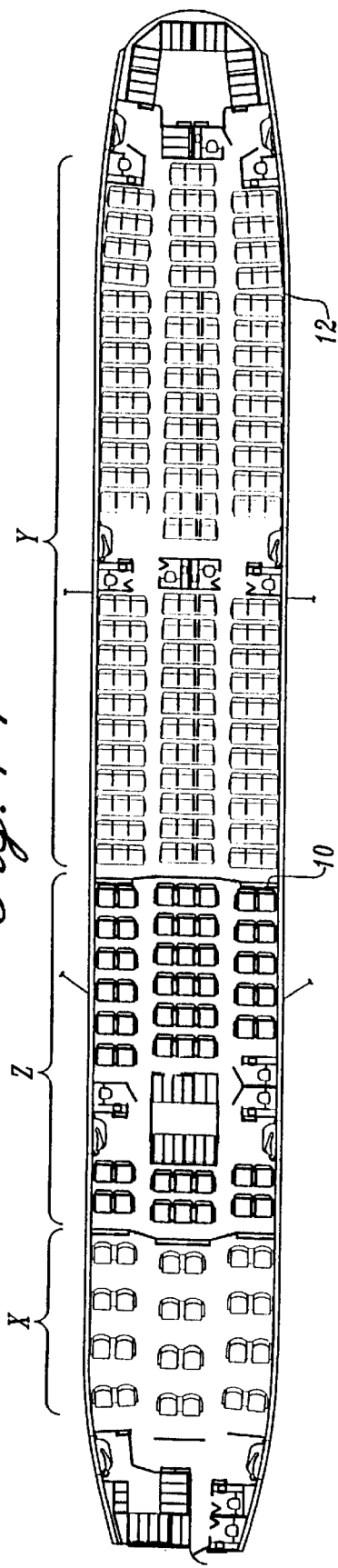

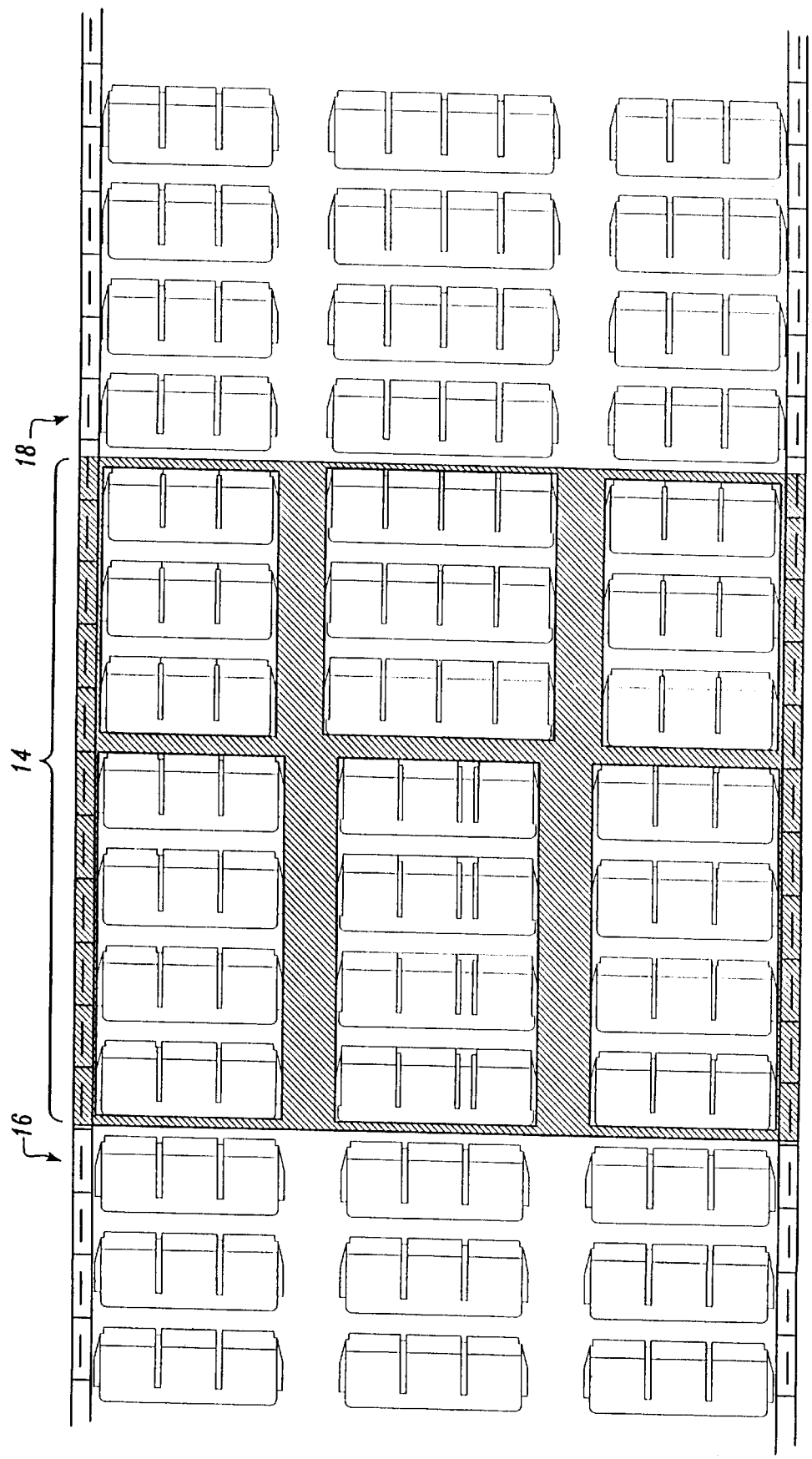

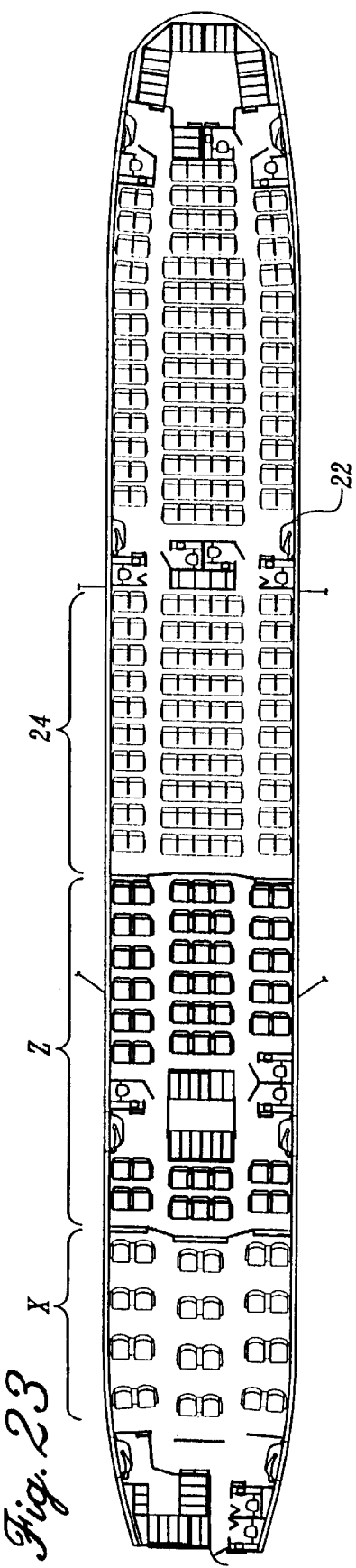
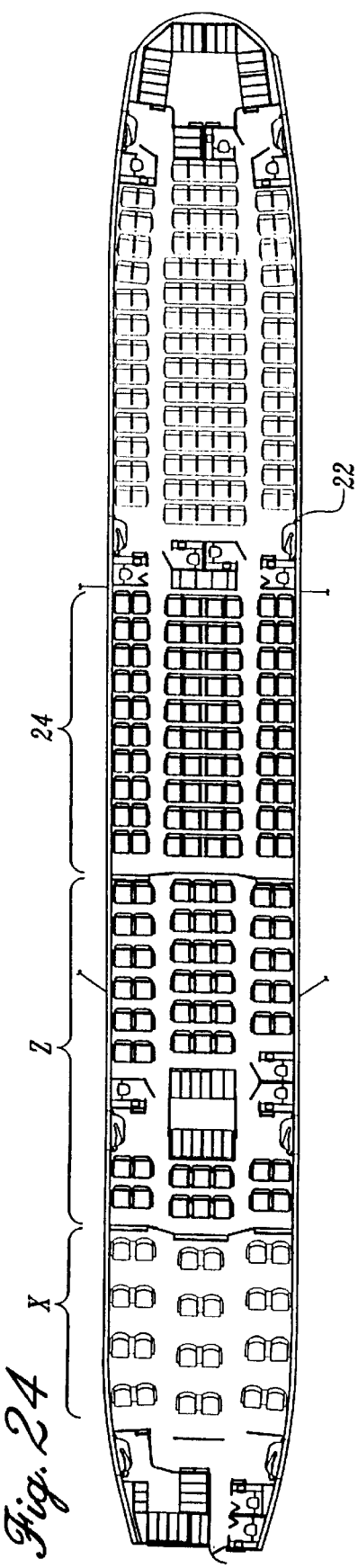
Fig. 23
Fig. 24

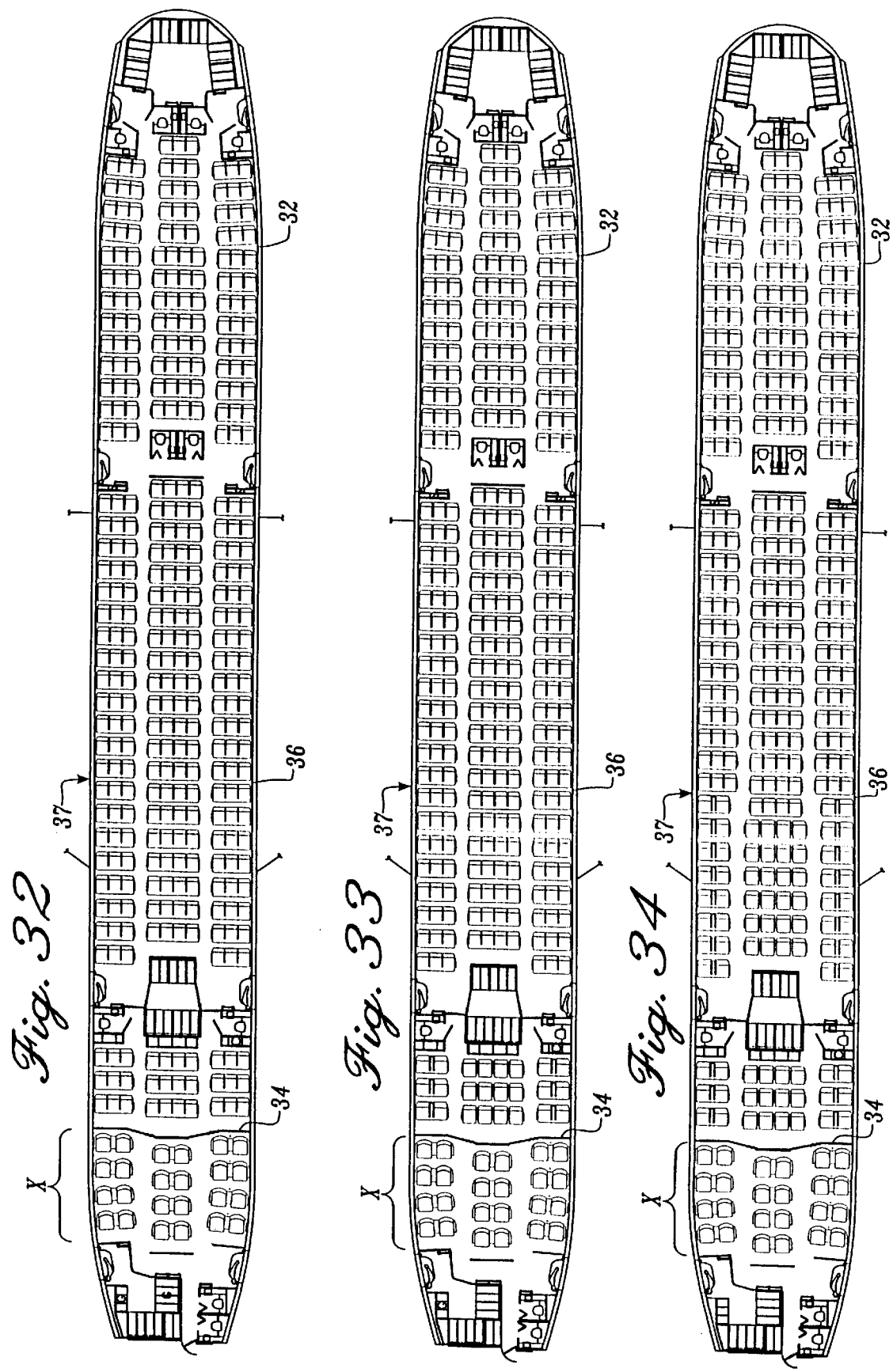

CONVERTIBLE SEAT SYSTEMS FOR WIDE BODY AIRCRAFT

This application is a divisional of prior application serial number 08/689,804, filed Aug. 14, 1996, still pending, priority from the filing date of which is hereby claimed under 35 U.S.C. § 120.

FIELD OF THE INVENTION

The present invention relates to passenger seating arrangements for wide body aircraft, i.e., aircraft having two or more passenger aisles, and more particularly to seating arrangements in which the number and/or width of individual seats within a row can be adjusted.

BACKGROUND OF THE INVENTION

A brief history of convertible seating arrangements for passenger aircraft is given in the article titled "Convertible Seats: Value-Driven Added Revenue for Airlines," presented at the SPEEDNEWS Aviation Industry Suppliers Conference in March 1995 by Richard L. Lankford of Boeing Commercial Airplane Group. In 1988, a team of Boeing engineers and designers conceived converting conventional economy-class seats to wider, more comfortable seats that might be attractive to a premium class of service. These efforts pertained to a standard-body, single aisle, six abreast 3/3 aircraft, where the "/" indicates the aisle position. The idea was to convert the 3/3 configuration of economy seats approximately 17 inches wide (as measured between the armrests) to a 3/2 configuration of seats about 19 inches wide. At one side of the aircraft, the triple seat unit would expand to produce three wider seats, whereas at the other side the triple seat unit would compress into two wider seats with some extra space between them. The Lankford article also discusses the potential economic benefits to an airline employing the new seats. See also O. Sutton et al., "Convertible Aircraft Seats Prove Their Worth," *INTERAVIA*, July/August 1995. The following U.S. patents are directed to this general type of 3/3 to 3/2 conversion:

| Inventors | U.S. Pat. No. |
| --- | --- |
| Daharsh et al. | 5,104,065 |
| Peltola et al. | 5,178,345 |
| Arnold et al. | 5,131,607 |

Simpson et al., U.S. Pat. No. 5,193,765 shows another seat unit that can be converted from three seats to two and back again.

For intermediate-size aircraft having twin aisle passenger compartments, such as the Boeing 767, and which typically accommodate six passengers per row in 2/2/2 configuration or seven passengers in 2/3/2 configuration, it has been proposed to use seat units which convert from a triple to a double and vice versa. For example, Slettebak U.S. Pat. No. 4,881,702 and Arnold et al., U.S. Pat. No. 5,284,739 propose constructions convertible from six abreast (2/2/2) to seven abreast (2/3/2). In these constructions, the outboard doubles expand or contract to widen or narrow the seat width, while the center unit contracts to a double or expands to a triple.

Another proposed convertible aircraft seat unit is disclosed in Simpson et al. U.S. Pat. No. 5,180,120, describing a quint convertible to a triple, but using a large number of removable components that, depending on the configuration, must be stowed.

Up to now, convertible seats have not been used in wider body aircraft, such as the Boeing 777 and Boeing 747. Further, the most modern seat configurations now require complicated and space-consuming amenities, such as individual electronic displays for each seat, which have not been adaptable to convertible seats currently in use.

SUMMARY OF THE INVENTION

The present invention provides convertible seat configurations for passenger cabins having two or more aisles, particularly the widest body aircraft in which each row in an economy section is at least eight abreast, more often nine abreast or ten abreast. In each instance, all seat components remain attached to their respective seat group, with no detachable units that have to be stowed; and in each instance the convertible seat configuration is adaptable to incorporating individual amenities, including individual electronic displays.

In a first embodiment of the invention, a center seat group is convertible from a quad to a triple. Such a center seat group is usable in some aircraft, such as a Boeing 777, for conversion from a ten abreast 3/4/3 tourist or discount economy configuration to a nine abreast 3/3/3 full fare economy configuration. The quad to triple seat group also can be used for conversion from an eight abreast 2/4/2 tourist or discount economy configuration to a seven abreast 2/3/2 full fare economy configuration, such as in a Boeing 767.

In another embodiment, a quint to quad center seat group is provided, usable in converting from a nine abreast 2/5/2 economy configuration to an eight abreast 2/4/2 business class configuration, such as in a Boeing 777.

The present invention also pertains to conversion from a ten abreast 3/4/3 economy configuration to an eight abreast 2/4/2 business class configuration by using triple to double convertible seat groups at the sides and an expandable-contractible quad seat group in the center, such as in a Boeing 777. Alternatively, the center quad seat group can be provided by identical expandable-contractible double seat groups placed side by side.

In a further embodiment, an eight abreast 3/2/3 configuration is convertible to a six abreast 2/2/2 configuration with individual electronic displays in all configurations and having a novel expanding armrest for the center double seat group.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 10 and 11 are corresponding top plans of the passenger cabin of an aircraft incorporating convertible seats primarily of the type shown in FIGS. 4–9, FIG. 10 illustrating the convertible seats primarily in the ten abreast configuration and FIG. 11 illustrating the convertible seats primarily in the nine abreast configuration;

FIG. 12 is a diagrammatic top plan of a "conversion section" of an aircraft passenger cabin having convertible seats in accordance with FIGS. 4–9;

FIGS. 23 and 24 are corresponding top plans of the passenger cabin of an aircraft incorporating convertible seats of the type shown in FIGS. 17–22, FIG. 23 illustrating the convertible seats in the nine abreast configuration and FIG. 24 illustrating the convertible seats in the eight abreast configuration;

FIGS. 32–34 are corresponding top plans of the passenger cabin of an aircraft incorporating convertible seats of the types shown in FIGS. 26–31, FIG. 32 illustrating the convertible seats in the ten abreast configuration, and FIGS. 33 and 34 illustrating the convertible seats partly in the ten abreast and partly in the eight abreast configuration;

DETAILED DESCRIPTION OF THE PREFERRED EMBODIMENT

Passenger cabins of modern aircraft are designed to maximize revenue for a typical flight. Ideally, this would involve analyzing the specific route to be flown, and designing the passenger compartment accordingly. For example, more room must be provided for long international flights than for regional flights, and more customers typically are willing to upgrade from one class to another if a long flight is involved. Nevertheless, the passenger mix will vary for an aircraft and compromises must be made. Such compromises can result in substantial loss of revenue, and passenger acrimony if a desired comfort level is not available or if vastly different prices are charged for seats having similar comfort levels.

Figure 1:
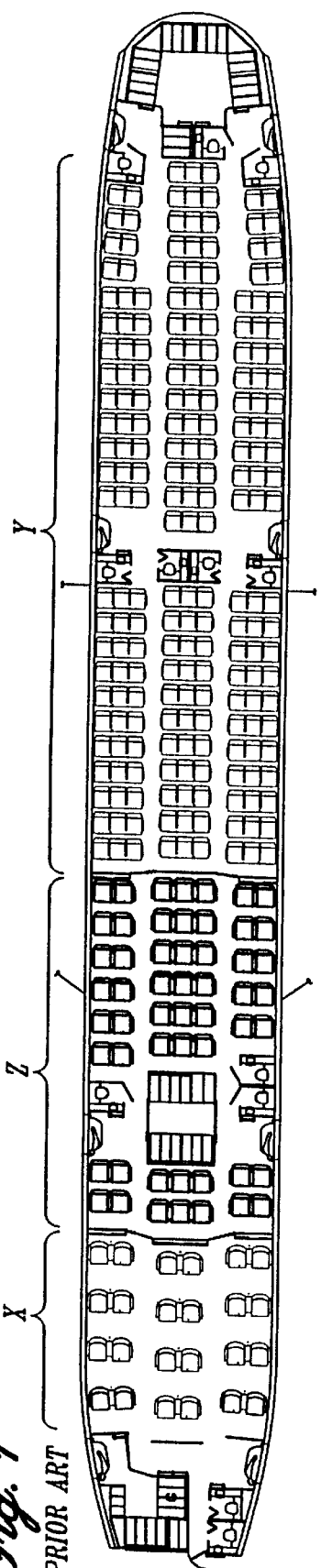
FIG. 1, FIG. 2 and FIG. 3 are corresponding diagrammatic top plans of the passenger cabin of a wide body aircraft illustrating three different fixed seat configurations.
Figure 2:
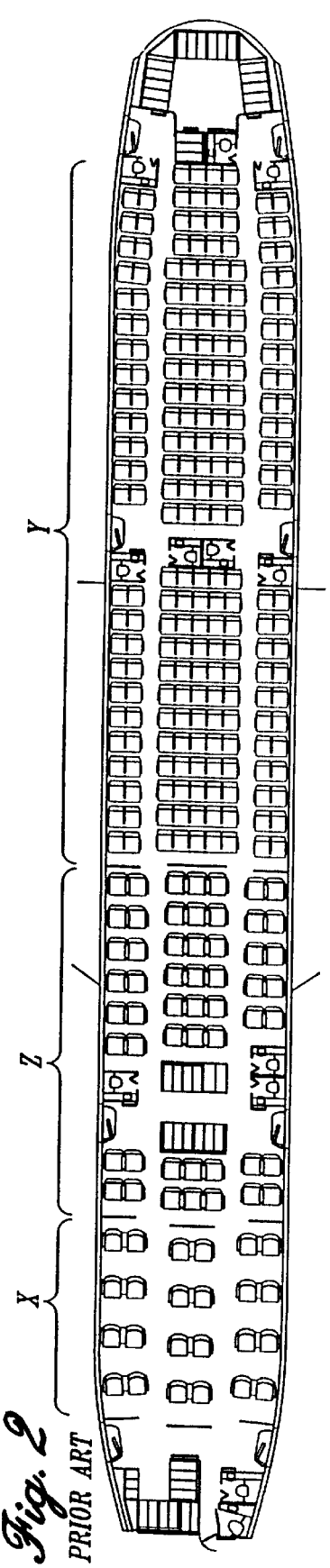
Figure 3:
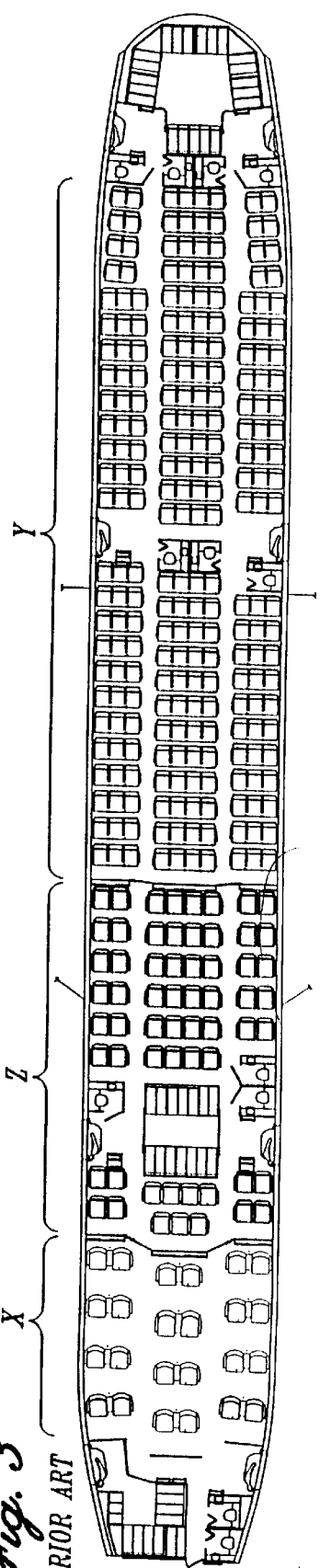

For example, FIG. 1, FIG. 2 and FIG. 3 show three of very many fixed seating arrangements for a new Boeing 777-200 aircraft, determined after considerable design effort and analysis. Each of the three illustrated configurations includes a 24-seat first class section X having four six abreast 2/2/2 rows, each seat being at least 21 inches wide between the armrests, armrests at least seven inches wide, aisle widths of at least 25 inches, and pitch of at least 60 inches. In the configuration of FIG. 1 and the configuration of FIG. 2, there is a central 54-seat business class section Z, primarily seven abreast seating (2/3/2) with a seat width of at least 20 inches, armrests at least six inches wide, aisle widths of at least 20 inches, and pitch of at least 38 inches. Such a business class arrangement would be appropriate for international service, i.e., transatlantic or transpacific. For shorter "regional" flights, a 61-seat business class compartment Z of the type shown in FIG. 3 can be used, where the seats are primarily eight abreast (2/4/2), each seat being at least 19 inches wide, armrests at least four inches wide, aisle widths of at least 19.5 inches, and pitch of at least 38 inches.

For the configuration of FIG. 1, the economy section Y behind business class consists of 214 seats, each at least 18.5 inches wide, with armrests at least 1.5 inches wide, aisle widths of at least 18.5 inches, and pitch of 32 inches. This section is primarily nine abreast (3/3/3) until the aftmost section of the plane is reached where the fuselage tapers. In the configuration of FIG. 2, the economy section Y also is primarily nine abreast, but in this case in a 2/5/2 configuration and with the pitch reduced to 31 inches for most center seat groups. This allows two additional five seat groups between the aisles. In addition, the center seats in the tapered aft section of the aircraft are quad seat groups as compared to the triples used in the embodiment of FIG. 1. The FIG. 2 configuration provides a total of 227 economy class seats, many of them with the reduced pitch.

In the regional configuration of FIG. 3, the tourist compartment Y is primarily ten abreast (3/4/3), each seat being at least 17 inches wide, with armrests at least 1.5 inches wide, and aisle widths of at least 16.5 inches. Most tourist class seats have a pitch of 32 inches, but many in the center aft section have a pitch of 31 inches. The tourist class capacity is 243 passengers.

Thus, the total capacity for the embodiment of FIG. 1 is 292 passengers (24 first class, 54 business class, 214 economy class); the capacity of the configuration of FIG. 2 is 305 passengers (24 first class, 54 business class, 227 economy class); and the capacity of the configuration of FIG. 3 is 328 passengers (24 first class, 61 business class, 243 tourist class). Nevertheless, for most routes the pricing of the seats unquestionably will have a greater effect on the overall revenue produced than the number of the passengers carried. Since it is impractical to change fixed seat configurations, the carrier must consider carefully which configuration is most likely to enhance revenue for the desired routes, and project passenger preference trends into the future. The present invention provides an additional degree of flexibility by allowing the seat comfort level to be changed. Airlines can add additional and variable classes of passenger service, which allows the pricing structure to be adjusted based on changing routes, passenger preferences and competing airline service on the same route.

FIGS. 4–9 show a first convertible seat system in accordance with the present invention where selected rows of seats are convertible from ten abreast 3/4/3 configurations to nine abreast 3/3/3 configurations, such as if it were desired to convert part of the tourist compartment Y of FIG. 3 to an economy compartment of the general type shown in FIG. 1. Each convertible row includes a right seat group 1R, a center seat group 1C, and a left seat group 1L. Each seat group has a supporting frame and legs 2 anchored to the passenger compartment floor 3 by conventional tracks and fasteners. The left and right seat groups are mirror images of each other, each being a three seat unit (triple), whereas the center seat group is convertible from a four seat unit (quad) to a triple. In the ten abreast configuration shown in FIGS. 4, 6 and 8, the seat locations are identified as A–J, proceeding from left to right in FIG. 4. The outboard seat locations A, B, C, H, I, J, are defined by the areas between the associated armrests 4. For such outboard seat groups, each seat location has a unitary seat back 5 and aligned seat bottom 6. In a ten abreast configuration, the left and right seat groups are contracted such that adjacent seat backs and bottoms abut at locations approximately aligned with the two center armrests.

Figure 4:
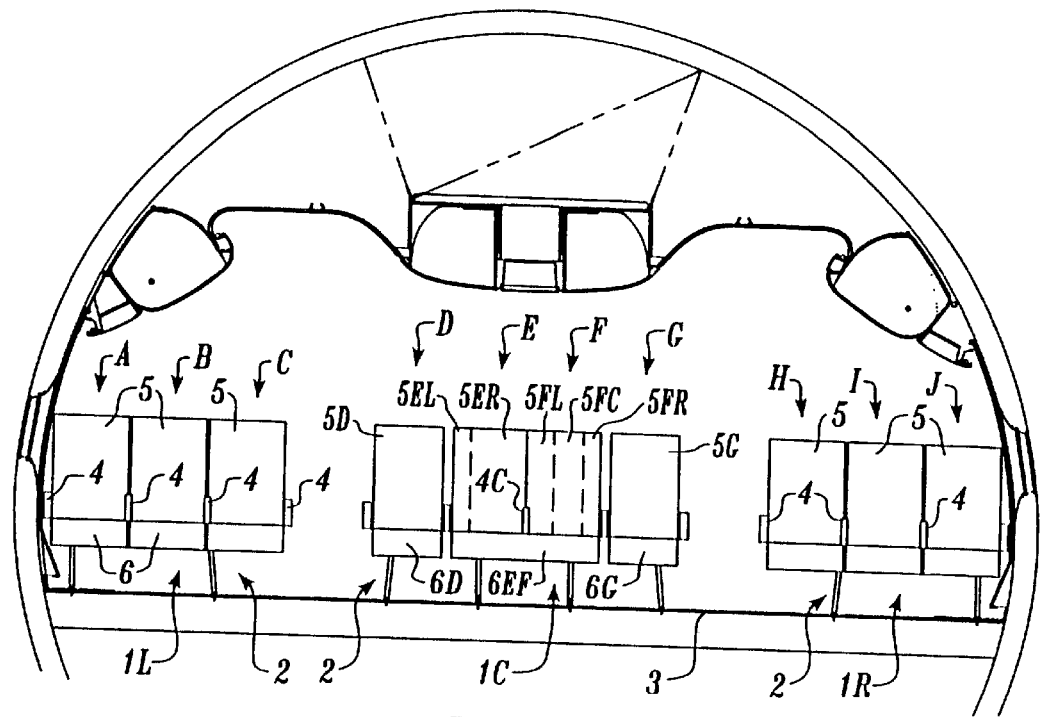
FIG. 4 and FIG. 5 are corresponding diagrammatic vertical sections through the passenger cabin of an aircraft having a convertible seat system in accordance with the present invention, FIG. 4 illustrating a ten abreast 3/4/3 configuration and FIG. 5 illustrating a nine abreast 3/3/3 configuration.
Figure 6:
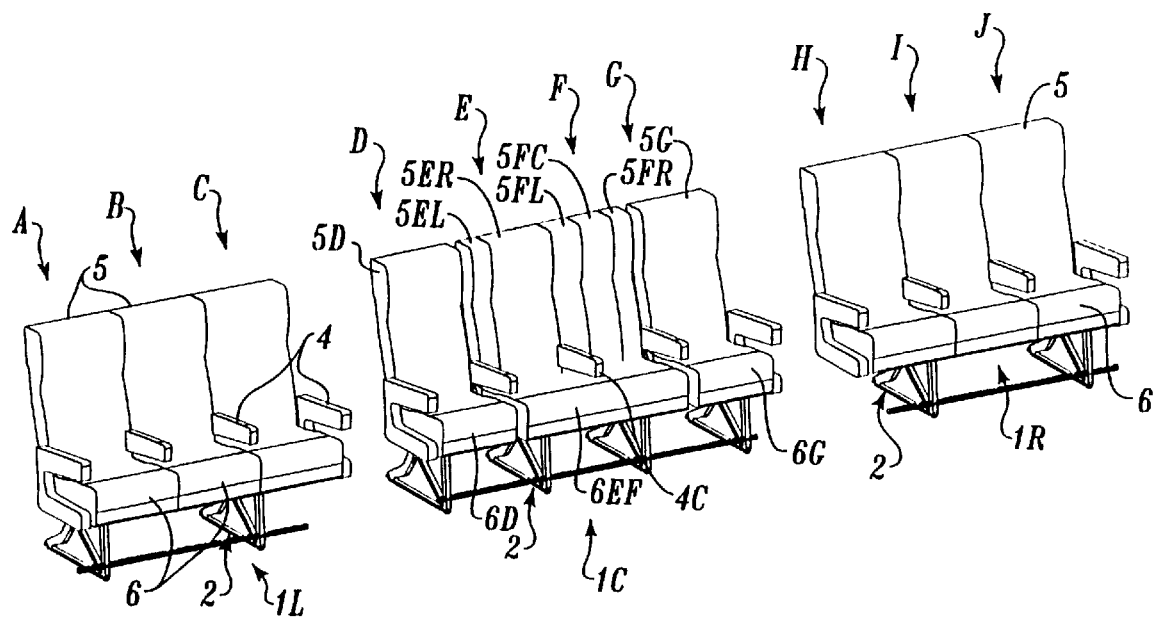
FIG. 6 is a top front perspective of the seat groups forming the ten abreast configuration of FIG. 4.
Figure 8:
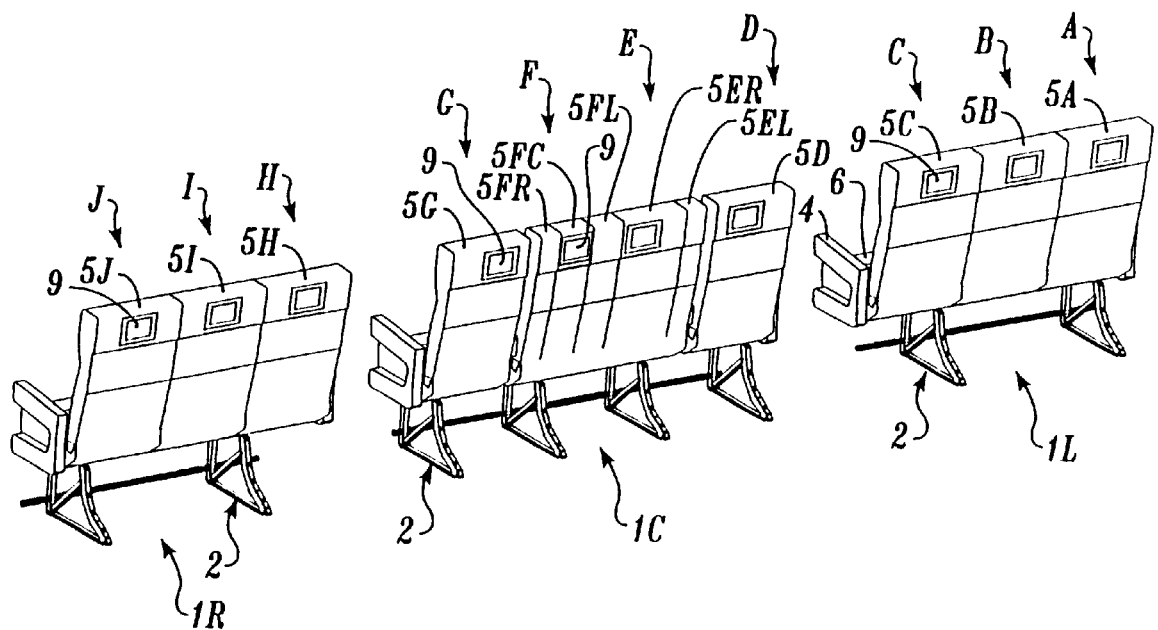
FIG. 8 is a top rear perspective of the seat groups forming the ten abreast configuration of FIGS. 4 and 6.

Still referring to FIG. 4, FIG. 6 and FIG. 8, the center seat group 1C includes outboard seat backs 5D and 5G aligned with seat bottoms 6D and 6G. A single seat bottom 6EF is provided for the two center seat locations. The seat backs for the center locations E and F are formed of multiple side-by-side sections. For location E, the seat back includes a narrow left section 5EL and a wider right section 5ER. The inboard side of section 5ER is approximately aligned with the center armrest 4C. For location F, the seat back is formed of three side-by-side sections of different widths, the narrowest being the right section 5FR, the next widest being the left section 5FL, and the widest being the center section 5FC. Sections 5EL and 5ER are coupled together for reclining as a unit, as are sections 5FL, 5FC and 5FR. For the ten abreast configuration shown in FIG. 4, the adjacent edges of seat back 5D and section 5EL are spaced apart a distance slightly greater than the width of an armrest, as are seat back 5G and section 5FR As used for a Boeing 777-200 aircraft, representative dimensions for the ten abreast configuration are as follows: total width of outboard seat units, about 59 inches as measured from the outboard side of the outboard armrest to the inboard side of the inboard armrest; total width of the center seat group, about 78 inches as measured from the outboard sides of the outboard armrests; aisle width about 17 inches between the armrests of adjacent seat groups; seat width between associated armrests about 17.35 inches; width of each armrest, 1.5 inches. For each outboard triple 1R and 1L, each seat back 5 and seat bottom 6 can be 18 inches wide. For the center seat group 1C, the width of the seat back and seat bottom sections can be: seat backs 5D and 5G and the corresponding seat bottoms 6D and 6G, 16.3 inches; seat bottom 6EF, 35.40 inches; seat back sections 5EL and 5FR (narrow outboard sections), 4.25 inches; seat back section 5ER, 13.45 inches; seat back section 5FL, 6.45 inches; seat back section 5FC, 7.00 inches.

Figure 5:
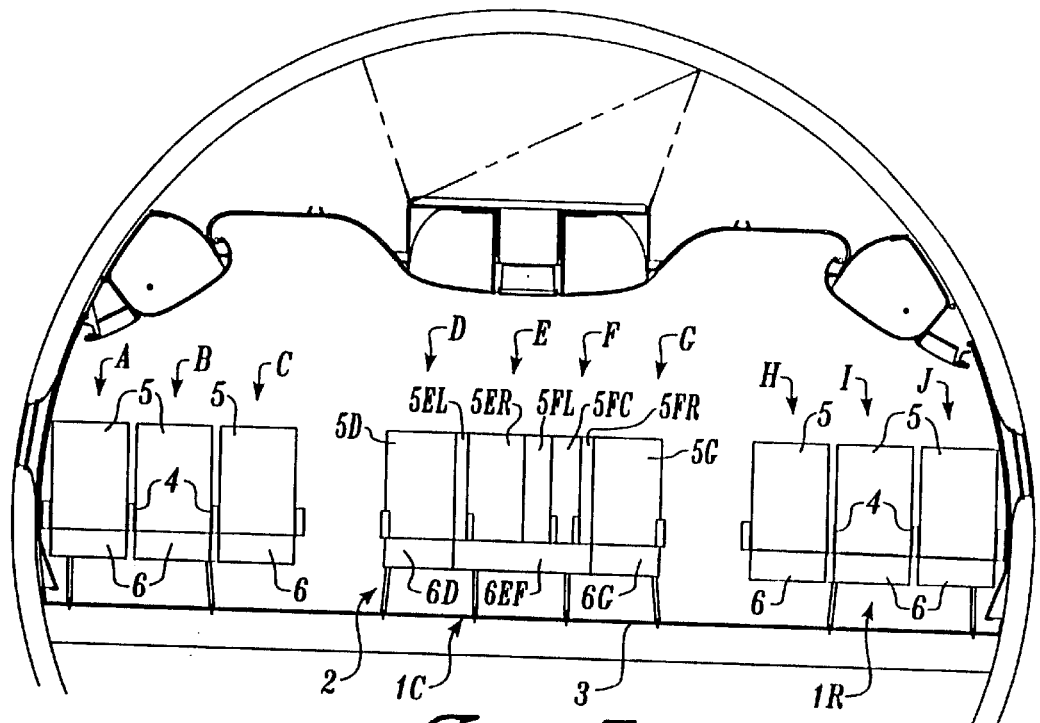
Figure 7:
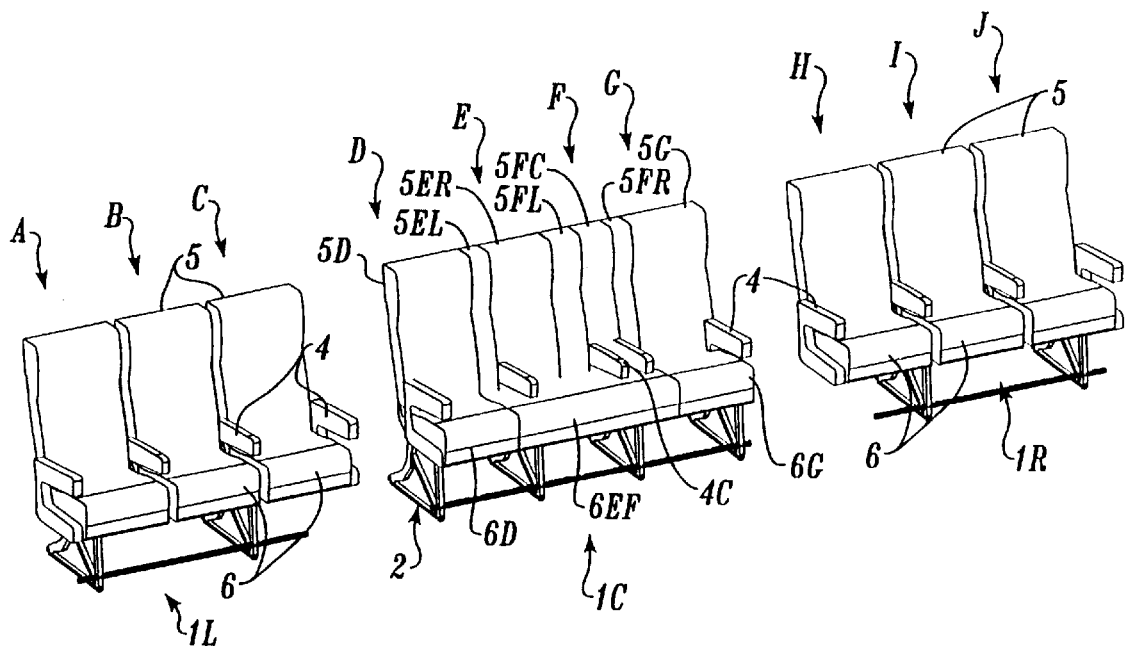
FIG. 7 is a top front perspective of the seat groups forming the nine abreast configuration of FIG. 5.
Figure 9:
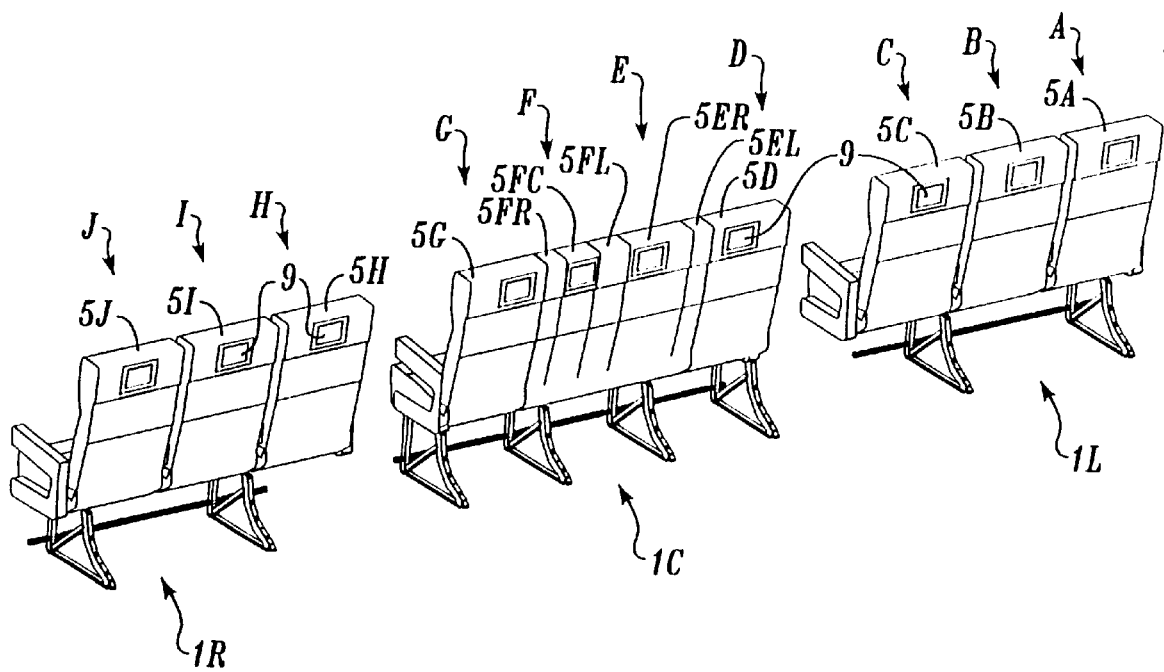
FIG. 9 is a top rear perspective of the seat groups forming the nine abreast configuration of FIGS. 5 and 7.

Conversion from the ten abreast 3/4/3 configuration of FIGS. 4, 6 and 8 to the nine abreast 3/3/3 configuration of FIGS. 5, 7 and 9 requires that the outboard seat units 1R and 1L be expanded and that the center seat unit 1C be contracted, which is achieved without changing the anchoring of the seat legs and frames to the floor. For the outboard seat units, the center and inboard seats are translated toward the buttline (centerline of the aircraft) and locked in position. The particular locking mechanism used is not critical. The armrests (except the outboard ones) translate correspondingly toward the buttline along the seat frame. For example, the translating armrests can be cantilevered from the frame by an inclined support arm that passes between the seat backs and bottoms. It will be noted that adjacent edges of adjacent cushions of the outboard seat groups are now spaced apart slightly. The overall width of each outboard seat group is increased to about 62.5 inches, and the individual seat width is increased to about 18.5 inches.

As compared to expansion of the outboard seat groups, the center seat group is contracted from about 78 inches to about 68 inches, with an increased seat width of 18.5 inches for the three remaining seat locations D, E, and G. The seat back sections are coupled together as follows: section 5EL is uncoupled from section 5ER and coupled to section 5D; section 5FL is uncoupled from section 5FC and coupled to section 5ER; section 5FC is uncoupled from both adjacent sections (5FL and 5FR); and section 5FR is coupled to seat back section 5G. Seat back sections that are coupled together will recline as a unit. Both outboard armrests translate toward the center equally to achieve the dimensions given above. The inboard armrest for seat location D is translated inboard a distance approximately equal to the width of section 5EL, and the inboard armrest for location G is translated inboard a distance approximately equal to the width of section 5FR. The remaining armrest, designated 4C, is translated from a location aligned between sections 5ER and 5FL to a location outboard of section 5FL. The total contraction of the center unit is greater than the combined expansion of the outboard units, increasing the aisle width to about 18.5 inches. Location F is eliminated as a functional seat. Although the center seat group is contracted such that the seat backs and bottoms substantially abut, there will be cracks between seat bottom sections 6D and 6G and the center section 6EF. However, the cracks are positioned so close to the inboard armrests (preferably no more than 4 to 5 inches) that passenger comfort is not affected. At that location, a crack is not noticed by a passenger, because a passenger seated in these positions would have both ischials (pelvic sit bones) on the same seat cushion segment. However, it is important that the center seat bottom 6EF be unitary because of the larger degree of shifting of seat location E. A crack aligned with the abutting edges of seat back units 5ER and 5FL, for example, could affect passenger comfort because it would be positioned closer to the center of the seat location, and would place a passenger's ischials on adjacent seat cushion sections.

With reference to FIG. 8, an individual electronics display 9 can be incorporated in seat back units 5A, 5B, 5C, 5D, 5ER, 5FC, 5G, 5H, 5I AND 5J. In the ten abreast configuration shown in FIG. 8, such units are approximately centered for the respective seat locations behind them. In the nine abreast configuration shown in FIG. 9, the display in unit 5FC is redundant and can be turned off, whereas the remaining units can be controlled conventionally by the passenger behind. Standard full width tray tables can be incorporated in seat backs 5A–5D and 5G–5J. For the two center locations, narrow tray tables having folding components can be used.

FIGS. 10 and 11 show representative configurations for a Boeing 777-200 when convertible seats of the type shown in FIGS. 4–9 are used. The first class compartments X and business class compartments Z are the same as for the fixed seat configurations of FIG. 1 and FIG. 2. In the economy/ tourist compartment Y, convertible seats have been provided from the aft business class divider 10 to the beginning of the aft taper of the aircraft (location 12). The configuration shown in FIG. 10 is essentially the same as the high capacity configuration of FIG. 3, with the exception that a "discounted economy" section of 3/3/3 configuration has been added in the taper aft of location 12. The configuration of FIG. 10 provides a capacity of 320 passengers (24 first class, 54 business class, 242 economy-discounted economy) with all economy-discounted economy seats having at least 32 inch pitch. When all convertible rows are changed to 3/3/3 configuration (FIG. 11), the capacity is decreased to 300 passengers (24 first class, 54 business class, 183 full-fare economy, 39 discounted economy). The wider seats are appropriate for longer flights, and can be sold at higher prices, possibly with increased amenities. It is not necessary that the configuration of each convertible row be changed. Sections can be converted to meet passenger demands for a specific flight.

FIG. 12 shows the intermediate portion of an economy-tourist configuration where a "conversion zone" 14 is formed between a forward nine abreast 3/3/3 fixed seat section 16 and an aft ten abreast 3/4/3 fixed seat configuration 18. Seven rows of convertible seats are in the conversion zone 14, the forward four rows being in the nine abreast configuration and the aft three rows being in the ten abreast configuration, illustrating transition from one class of fixed seating to another.

Figure 13:
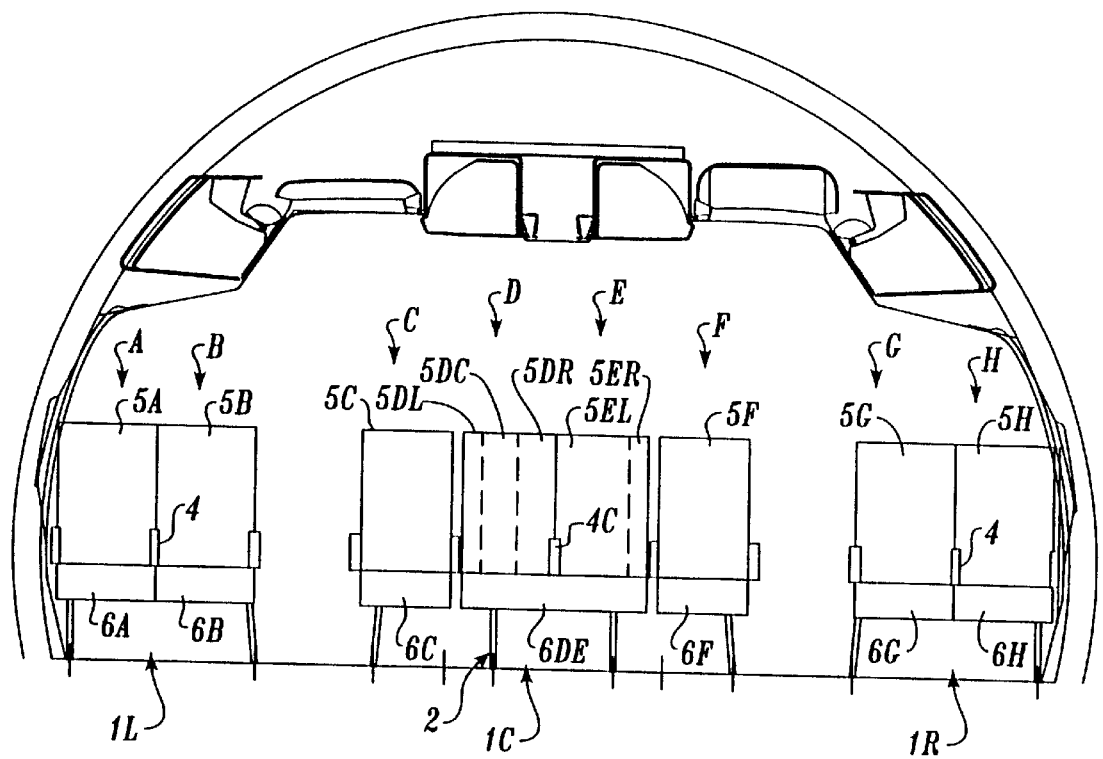
FIG. 13 and FIG. 14 are corresponding diagrammatic vertical sections through the passenger cabin of an aircraft having another convertible seat system in accordance with the present invention, FIG. 13 illustrating an eight abreast 2/4/2 configuration and FIG. 14 illustrating a seven abreast 2/3/2 configuration.

The quad to triple seat group also has application in narrower aircraft, such as a Boeing 767. FIG. 13 illustrates an eight abreast 2/4/2 configuration convertible to the seven abreast 2/3/2 configuration of FIG. 14. In the eight abreast configuration, the seat locations are identified as A–H, proceeding from left to right in FIG. 13. The outboard seat groups 1L and 1R are expandable-contractible doubles, rather than triples as in the previously described embodiment. Each seat location is defined by the distance between the associated armrests. For each outboard seat group, each seat location has a unitary seat back 5 and aligned seat bottom 6. In the eight abreast 2/4/2 configuration, the left and right seat groups are contracted such that adjacent edges of the seat backs and bottoms are approximately aligned with the center armrests 4.

The center seat unit 1C includes outboard seat backs 5C and 5F aligned with seat bottoms 6C and 6F. A single seat bottom 6DE is provided for the two center seat locations. The seat backs for the center locations D and E are formed of multiple side-by-side sections. For location E (corresponding to location E of the previously described embodiment), the seat back includes a narrow right section 5ER and a wider left section 5EL. The inboard side of section 5EL is approximately aligned with the center armrest 4C. For location D, the seat back is formed of three side-by-side sections, the narrowest being the left section 5DL. The right section 5DR and the center section 5DC can be of equal widths. Sections 5EL and 5ER are coupled together for reclining as a unit, as are sections 5DL, 5DC and 5DR.

As used for a Boeing 767 aircraft, representative dimensions for the eight abreast 2/4/2 configuration (FIG. 13) are as follows: total width of outboard seat units, about 38 inches as measured from the outboard side of the outboard armrest to the inboard side of the inboard armrest; total width of the center seat group, about 75 inches as measured from the outboard sides of the outboard armrests; aisle width about 16.5 inches between the adjacent armrests of adjacent seat groups; seat width 16.5 inches; width of armrest, 1.5 inches to 2 inches.

Figure 14:
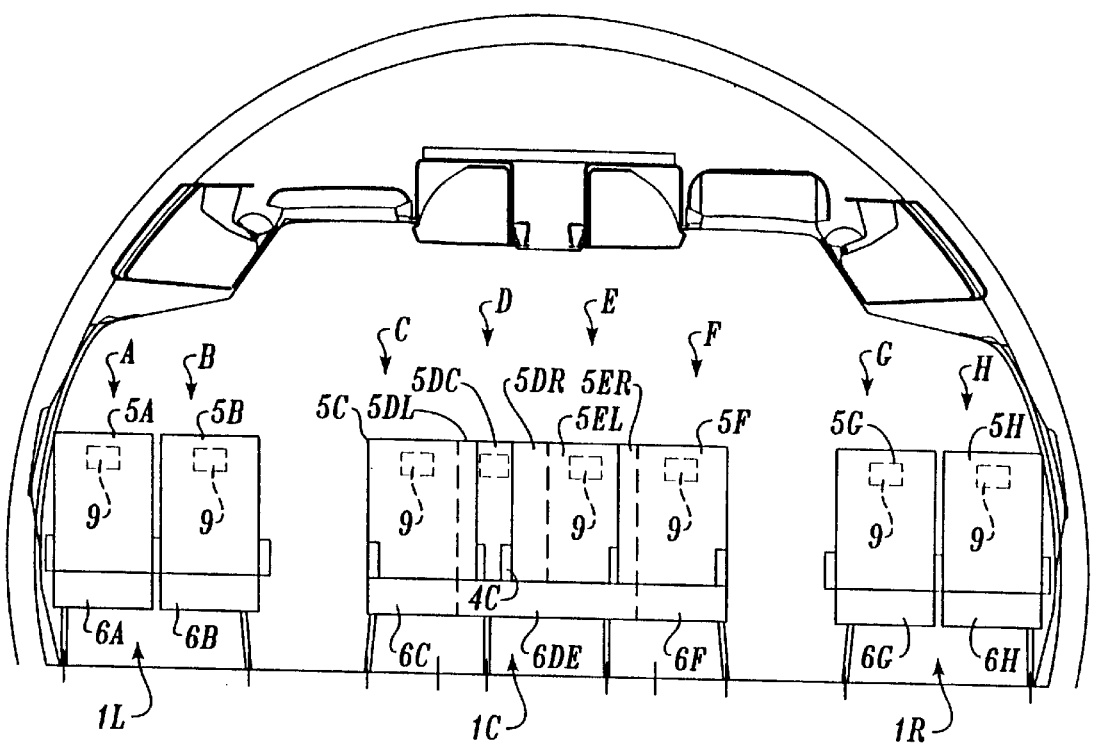

Conversion from the eight abreast 2/4/2 configuration of FIG. 13 to the seven abreast 2/3/2 configuration of FIG. 14 requires that the outboard seat units 1R and 1L be expanded and that the center seat unit 1C be contracted. As for all embodiments of the present invention, this is achieved without changing the anchoring of the seat legs 2 and frames to the floor. For the outboard seat units, the inboard seats are translated toward the buttline and locked in position. Again, the particular locking mechanism is not critical. The center and inboard armrests also translate along and are locked to the seat frames. As can be seen in FIG. 14, the adjacent edges of the outboard seat cushions are now spaced apart slightly. The overall width of each outboard seat group is increased to about 41 inches, and the individual seat width is increased to about 18 inches.

The center seat group 1C is contracted from about 75 inches, with a seat width of 16.5 inches, to about 66 inches, with a seat width of 18 inches. The seat back sections are coupled together as follows: section 5DL is uncoupled from section 5DC and coupled to section 5C; section 5ER is uncoupled from section 5EL and coupled to section 5F; section 5DR is uncoupled from section 5DC and is coupled to section 5EL. The inboard armrest for seat location F translates inboard to a location approximately aligned between seat back sections 5ER and 5EL; the inboard armrest for seat location C translates inboard to a position approximately aligned between seat back sections 5DL and 5DC; and the center armrest 4C translates to a position approximately aligned between seat back sections 5DR and 5DC. Seat location D is eliminated as a functional seat. Seat bottom cracks in seat locations C and F are closely adjacent to an armrest so as not to be noticeable by a passenger, and the unitary seat bottom 5DE has no intermediate cracks when it accommodates seat locations 5D and E in the eight abreast configuration or when is accommodates seat location 5E in the seven abreast configuration. Individual video displays 9 shown diagrammatically in broken lines in FIG. 14 can be incorporated in the seat backs 5A–5C, 5DC, 5EL, and 5F–5H, with the display in seat back section 5DC being turned off in the seven abreast configuration of FIG. 14.

Representative dimensions for the seat backs can be as follows: 5A, SB, SG, 5H, 18 inches; SC and 5F, 16 inches; 5DL, 4 inches; 5DC and 5DR, 6.5 inches; 5EL, 13 inches; 5ER, 4 inches. Representative dimensions for the seat bottoms can be as follows: 6A, 6B, 6G, 6H, 18 inches; 6C and 6F, 16 inches; 6DE, 34 inches.

Figure 15:
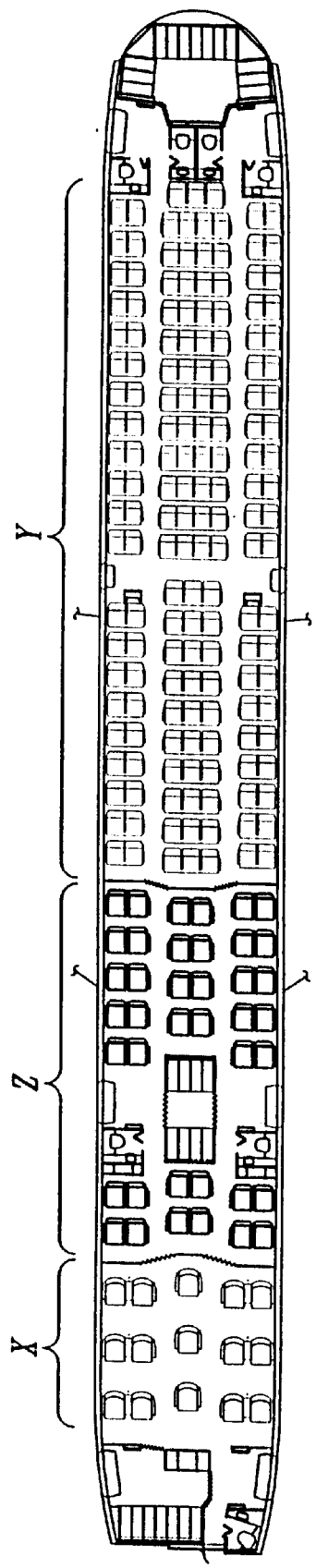
FIGS. 15 and 16 are corresponding top plans of the passenger cabin of an aircraft incorporating convertible seats of the type shown in FIGS. 13 and 14, FIG. 15 illustrating the convertible seats primarily in the eight abreast configuration and FIG. 16 illustrating the convertible seats primarily in the seven abreast configuration.
Figure 16:
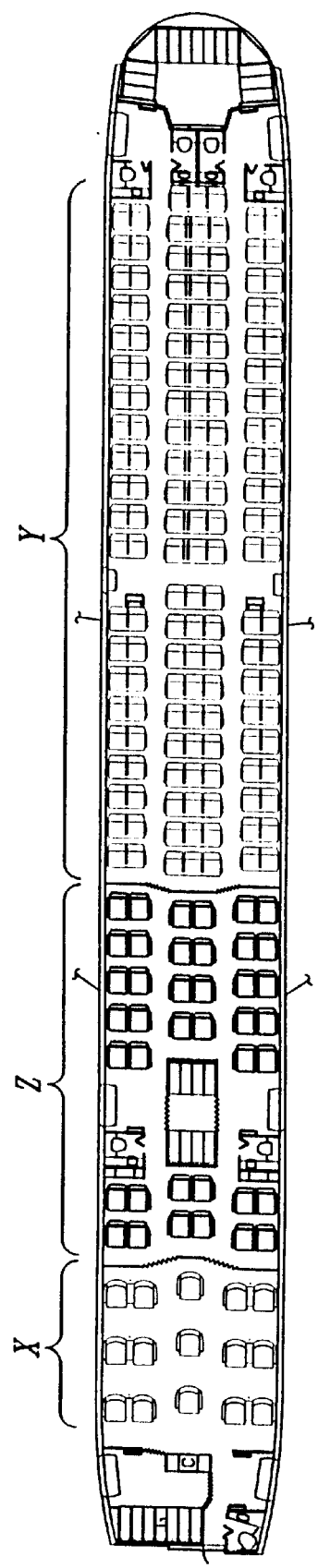

FIGS. 15 and 16 show representative configurations for a Boeing 767 when convertible seats of the type shown in FIGS. 13 and 14 are used. Identical first class compartments X and business class compartments Z are shown, with the tourist and economy compartments Y having the convertible seats. In each configuration, 15 first class and 40 business class seats are provided. Also, just aft of the business class section, nine rows of full fare economy fixed seats (32 inch pitch) are provided, with one extra center triple at the rear, for a total of 66 full fare economy seats in this part of the cabin. Convertible seats in accordance with FIGS. 13 and 14 are provided in the next 12 rows with, primarily, 32 inch pitch. Such seats can be sold as full fare economy in the seven abreast 2/3/2 configuration of FIG. 16, in which case 153 full fare economy seats are available. Alternatively, the aft section of the cabin can be converted to an eight abreast 2/4/2 configuration as illustrated in FIG. 15, providing 99 discount economy seats in addition to the fixed 66 full fare economy seats. The configuration of FIG. 16 provides a capacity of 208 passengers (15 first class, 40 business class, 153 full fare economy) as compared to the configuration of FIG. 15 which has a capacity of 220 passengers (15 first class, 40 business class, 66 full fare economy, 99 discount economy). Seat comfort can be correlated with price more logically than presently occurs.

Figure 17:
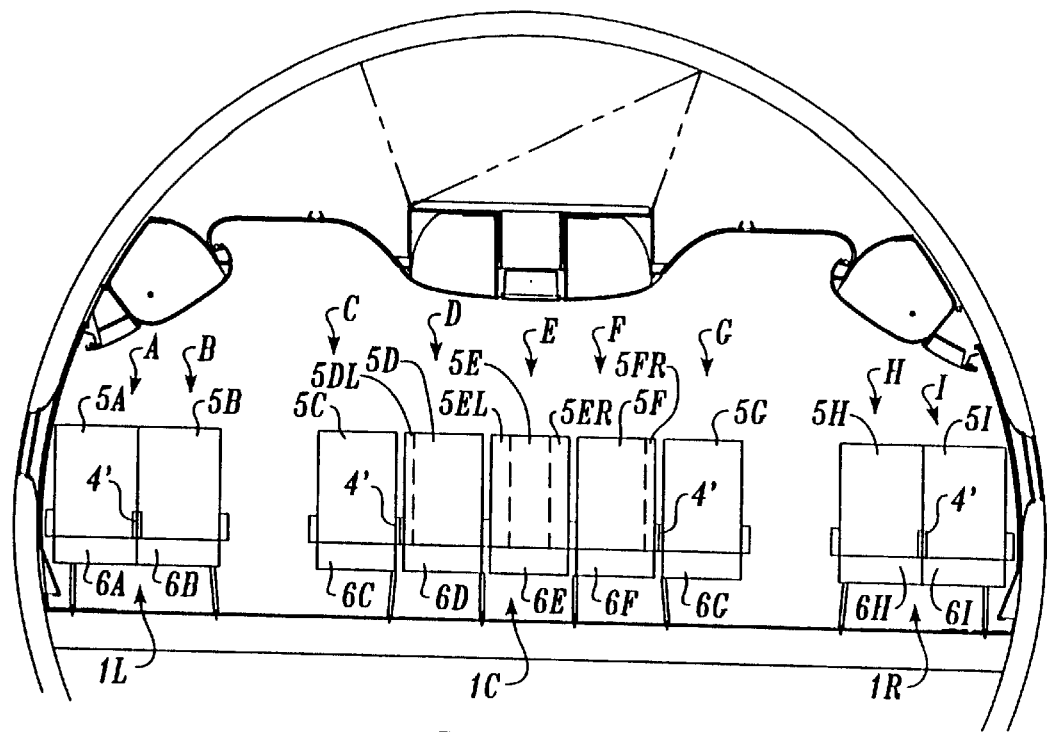
FIGS. 17 and 18 are corresponding diagrammatic vertical sections through the passenger cabin of an aircraft having another convertible seat system in accordance with the present invention, FIG. 17 illustrating a nine abreast 2/5/2 configuration and FIG. 18 illustrating an eight abreast 2/4/2 configuration.

In the embodiment of the present invention shown in FIGS. 17–22, twin aisle seat groups are convertible from nine abreast 2/5/2 configuration to eight abreast 2/4/2 configuration. A representative application for convertible seats of this type is a Boeing 777-200. Referring to FIG. 17, the nine seat locations in the 2/5/2 configuration are identified as A–I. The outboard seat groups 1L and 1R are expandable-contractible doubles, with each seat location having an aligned seat back 5 and seat bottom 6. For the center seat unit 1C, the outboard locations C and G have aligned seat backs and seat bottoms 5C, 6C and 5G, 6G. Seat location D has a narrow seat back section 5DL coupled to a wider seat back section 5D, to form a seat back unit aligned with a separate seat bottom 6D. Seat location F is the mirror image of seat location D, including a separate seat bottom 6F, and wide seat back section 5F coupled to a narrow seat back section 5FR. The center seat location E has a single seat bottom 6E and a three-part seat back consisting of a wide center section 5E and narrow side sections 5ER and 5EL coupled to the center section. Seat back sections coupled together will recline as a unit.

In the nine abreast 2/5/2 configuration shown in FIG. 17, representative dimensions are as follows: width of outboard doubles, 43 inches; width of center unit 104.5 inches; aisle width, 19.25 inches. Seat backs and bottoms for the outboard doubles can be 19.5 inches wide. For the center seat group, all seat bottoms can be 18.5 inches wide. Correspondingly, seat backs 5C and 5G can be 18.5 inches wide. Seat back sections SD and 5F can each be 16.75 inches wide, and the adjacent sections 5DL and 5FR can each be 2 inches wide. Seat back section 5E can be 9.5 inches wide, sandwiched between sections 5ER and SEL each of which can be 4.5 inches wide. Seat width for all nine seat locations is 18.5 inches between the armrests, with all armrests being two inches wide.

Figure 18:
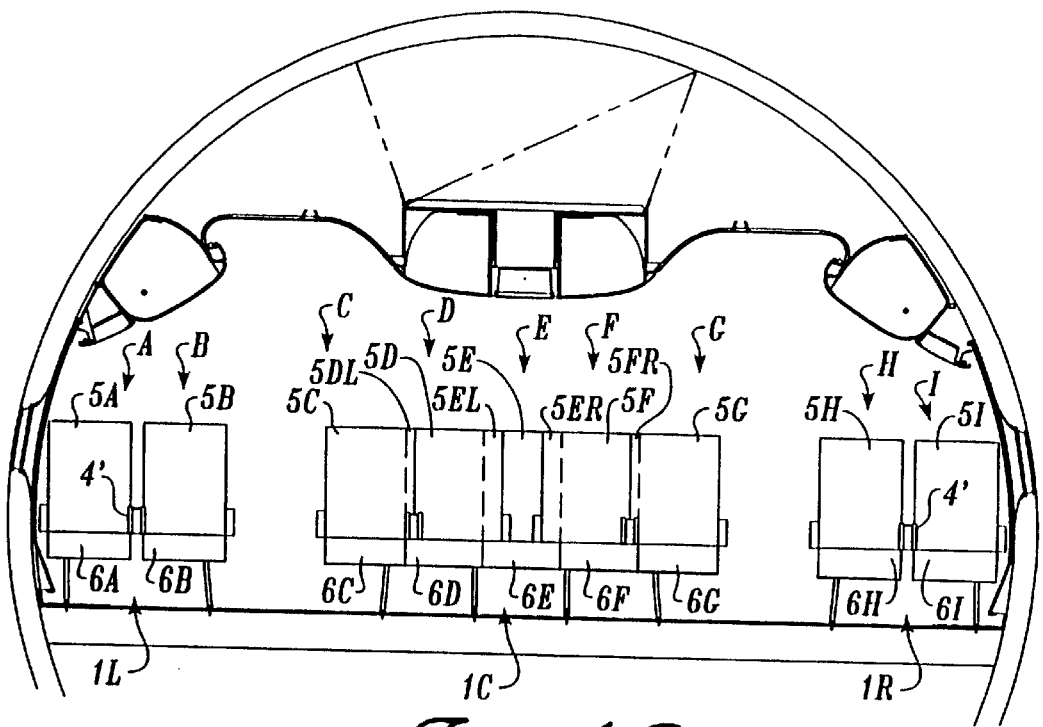
Figure 19:
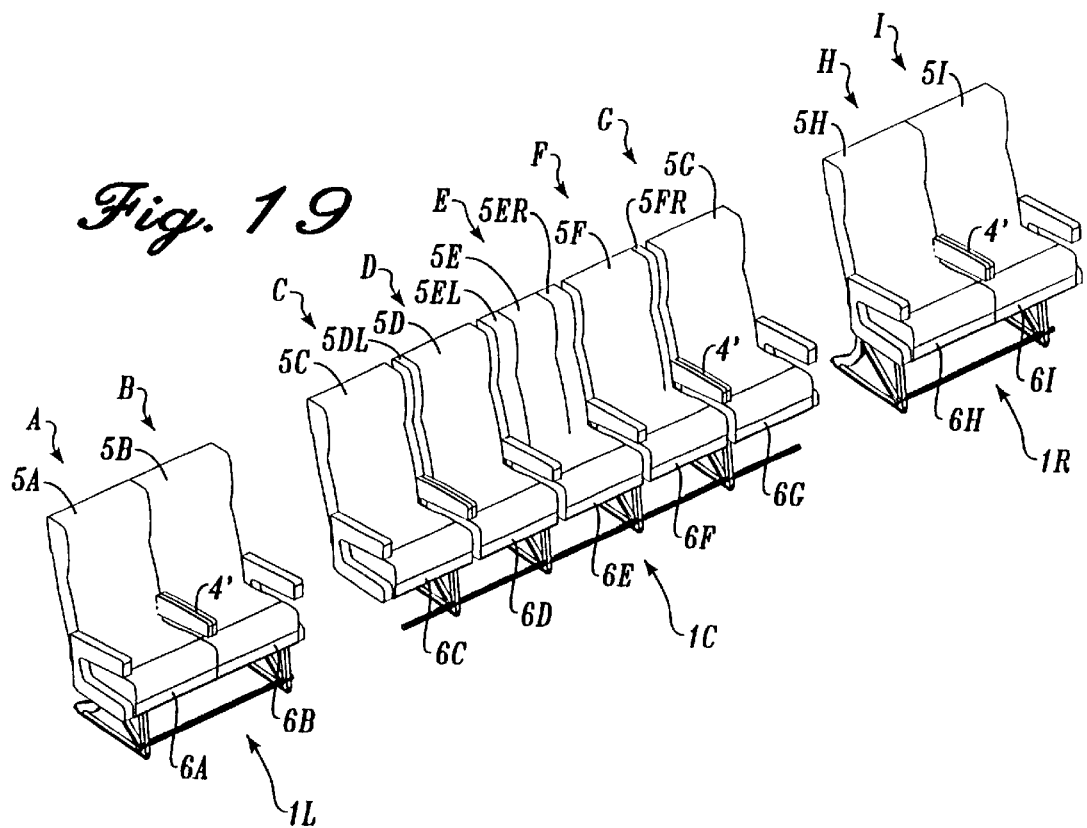
FIG. 19 is a top front perspective of the seat groups forming the nine abreast configuration of FIG. 17.
Figure 20:
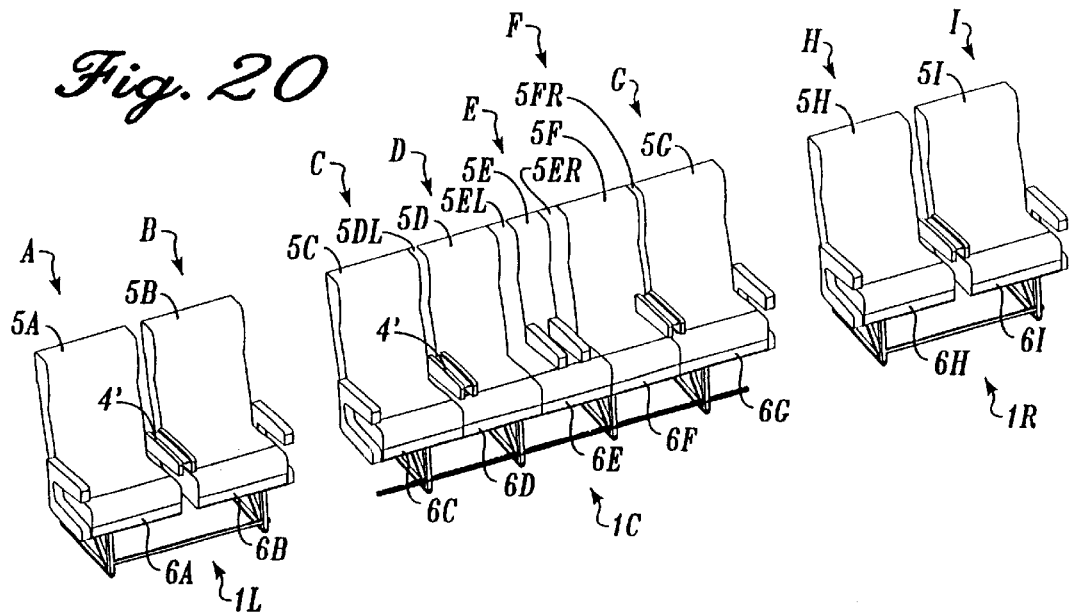
FIG. 20 is a top front perspective of the seat groups forming the eight abreast configuration of FIG. 18.
Figure 22:
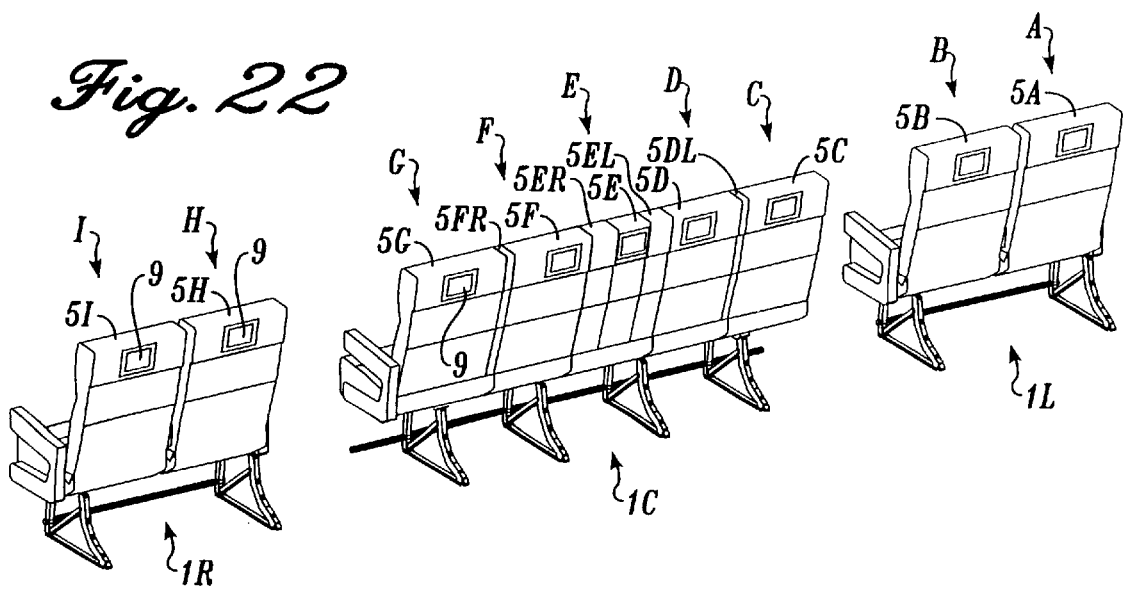
FIG. 22 is a top rear perspective of the seat groups forming the eight abreast configuration of FIGS. 18 and 20.

To convert to the eight abreast 2/4/2 configuration of FIGS. 18,20 and 22 the outboard doubles 1R and 1L are expanded by outward translation of the inboard seats and center and inboard armrests, increasing the total width of each outboard seat group to 46 inches and resulting in seat widths of 19 inches.

The center seat group 1C is compressed to a total width of 97.5 inches, making the aisle width 19.75 inches. For seat locations C and G, seat width is increased by inward translation of the inboard armrests 4'. Seat back section 5DL is uncoupled from section 5D and coupled to seat back section 5C. The inboard edge of section SDL is closely adjacent to the outboard edge of section 5D and approximately aligned with the center of the associated armrest. Similarly, at the other side of the center seat group, section 5FR is uncoupled from section 5F and coupled to section 5G. Toward the center, section 5ER is uncoupled from section 5E and coupled to section 5F, and section 5EL is uncoupled from section 5E and coupled to section 5D. Seat location E is eliminated and seat back 5E does not recline with the coupled seat backs for locations D and F. It should be noted that the cracks between seat bottoms 6E and 6F, and 6E and 6D are closely adjacent to the inboard armrests so as not to be noticeable by passengers occupying those seats. Preferably, those armrests marked 4' are of a special construction described below with reference to FIGS. 46–49 or 50–53, which expand and have a broader top surface rather than being separated, although pairs of narrower one inch armrests can be used in which case they will simply be spaced farther apart in the 2/4/2 configuration.

Figure 21:
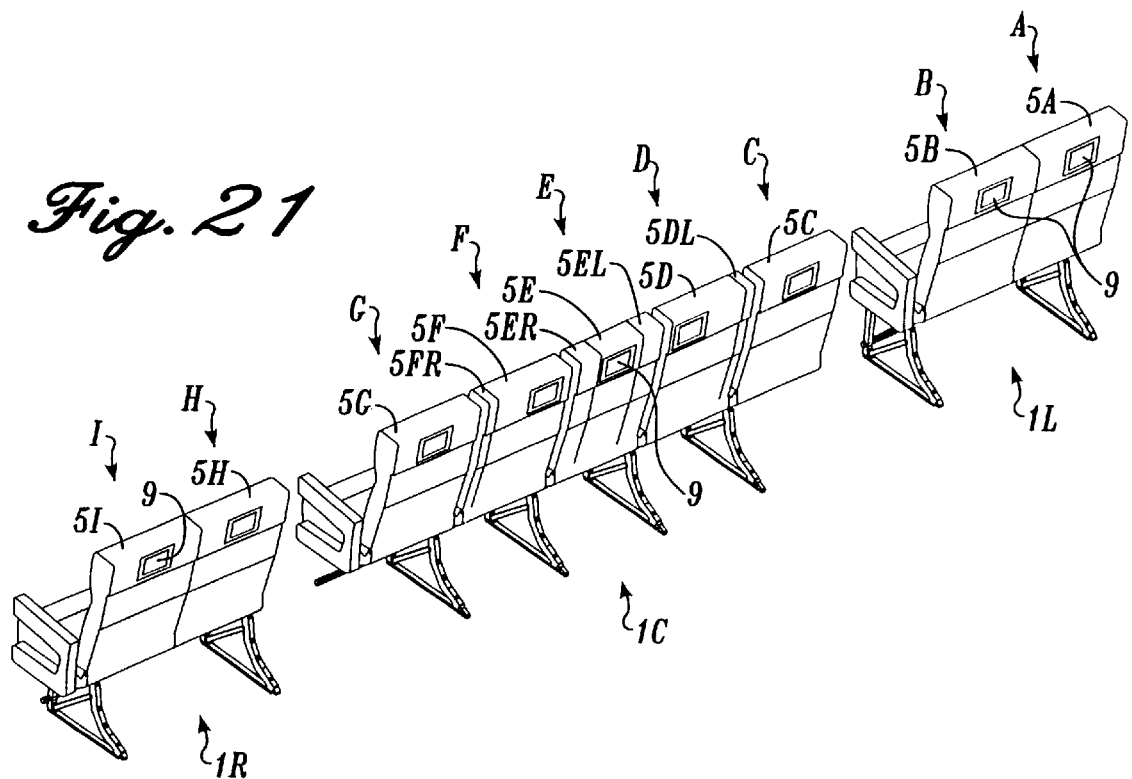
FIG. 21 is a top rear perspective of the seat groups forming the nine abreast configuration of FIGS. 17 and 19.

As seen in FIG. 21, in the nine abreast configuration, there still is an individual electronic display 9 associated with each of the nine seat locations. In the eight abreast configuration of FIG. 22, the display unit in the nonfunctional center seat back section 5E can be turned off.

FIG. 23 and FIG. 24 show representative configurations for a Boeing 777-200 when convertible seats of the type shown in FIGS. 17 through 22 are used. In each instance: the first class compartment X has 24 seats arranged in 2/2/2 configuration; the business class compartment Z has 54 seats arranged primarily in 2/3/2 configuration; and the aft portion of the aircraft, from location 22 aftward, has 125 economy seats arranged primarily in 2/5/2 configuration, back to the tapering toward the tail. A conversion zone 24 is provided in the middle of the aircraft, consisting of ten rows of convertible seats. In the 2/5/2 configuration of FIG. 23, 90 economy seats are provided in this zone, as compared to the 2/4/2 configuration of FIG. 24 in which 80 full fare economy seats are provided. Preferably pitch is larger in the conversion zone than in the aft economy section. For example, seats in the aft economy section can have primarily 32 inch pitch, as compared to 34 inch pitch in the conversion zone, 38 pitch in business class, and 60 inch pitch in first class. The loss of ten seats by converting from 2/5/2 to 2/4/2 configuration is more than compensated for by increased fares.

Figure 25:
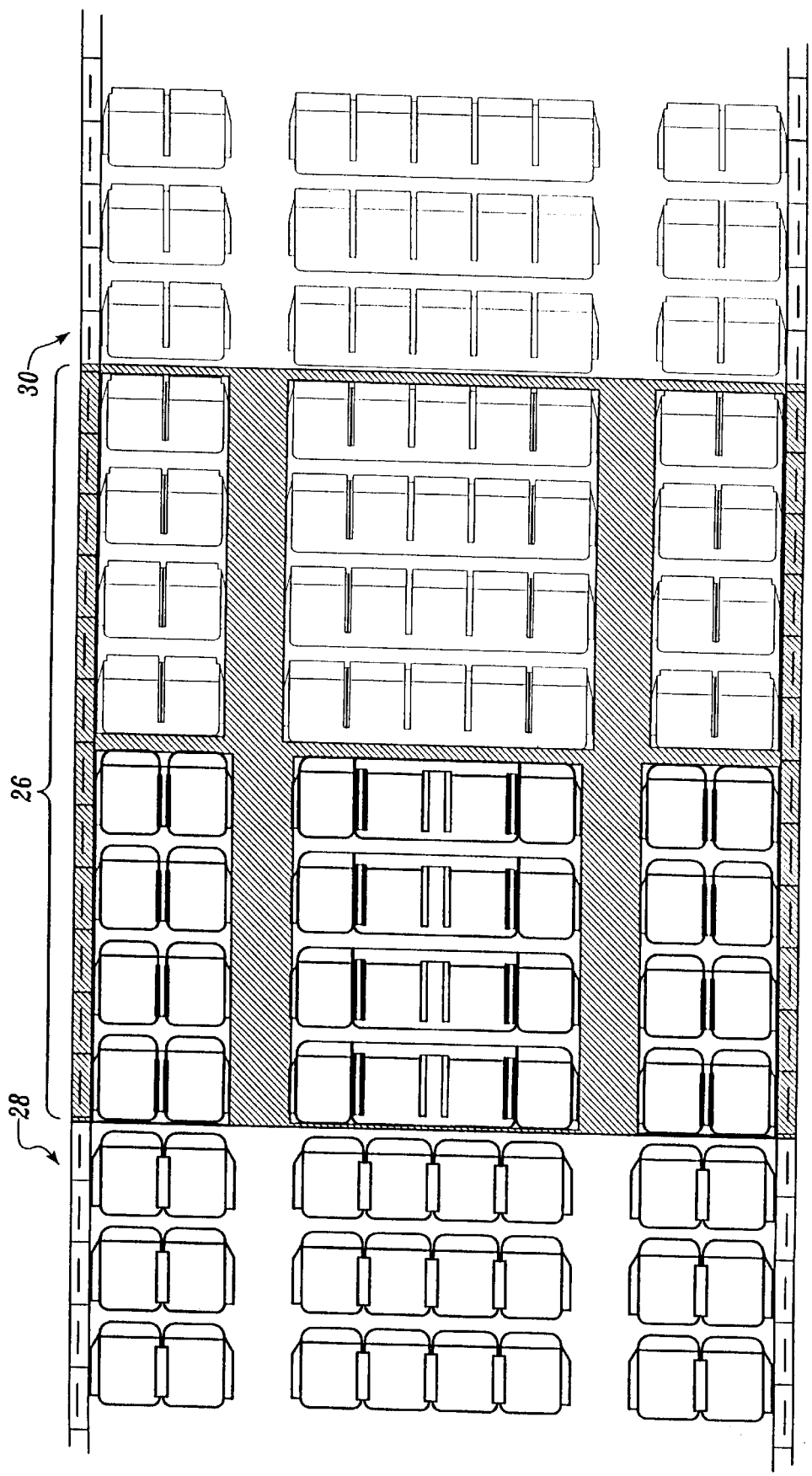
FIG. 25 is a diagrammatic top plan of a "conversion section" of an aircraft employing convertible seats in accordance with FIGS. 17–22.

FIG. 25 shows a modified conversion zone 26 using seats of the type shown in FIGS. 17–22, between forward fixed seats 28 of 2/4/2 configuration and aft fixed seats 30 of 2/5/2 configuration. Such conversion zone consists of eight rows, the four forward rows being eight abreast and the four aft rows being nine abreast.

Figure 26:
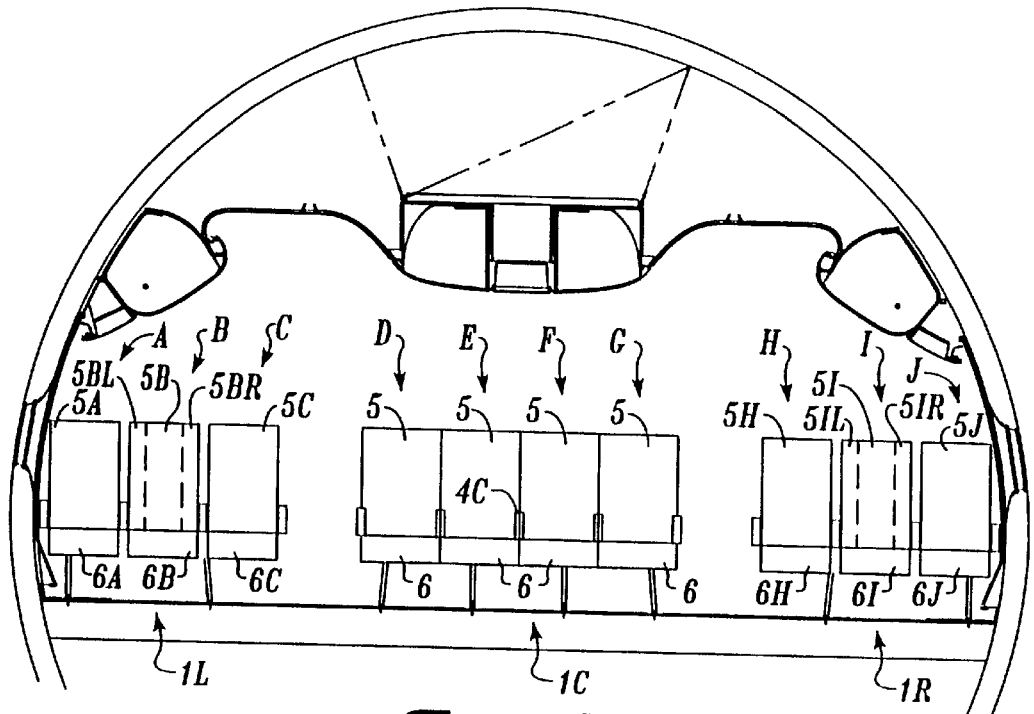
FIG. 26 and FIG. 27 are corresponding diagrammatic vertical sections through the passenger cabin of an aircraft having another convertible seat system in accordance with the present invention, FIG. 26 illustrating a ten abreast 3/4/3 configuration, and FIG. 27 illustrating an eight abreast 2/4/2 configuration.

In the embodiment of the present invention shown in FIGS. 26–31, twin aisle seat groups are convertible from ten abreast 3/4/3 configuration to eight abreast 2/4/2 configuration. A representative application for convertible seats of this type is a Boeing 777-200. Referring to FIG. 26, the ten seat locations in the 3/4/3 configuration are identified as A–J. The center seat group 1C is an expandable-contractible quad, with each seat location DG having an aligned seat back 5 and seat bottom 6. For the outboard seat groups 1L and 1R the inboard and outboard seats have aligned seat backs and seat bottoms (5A, 6A; 5C, 6C; 5H, 6H; 5J, 6J). For each outboard seat group 1L, 1R, the center seat (location B or location I) has a three-part seat back including a wide center section (5B or 5I) flanked by narrower side sections (5BL, 5BR; or 5IL, 5IR). Such three-part sections are coupled together for reclining as a unit. In the ten abreast 3/4/3 configuration shown in FIG. 26, representative dimensions are as follows: width of outboard triples, 59 inches; width of center quad, 78 inches; seat width and aisle width, 17 inches. For outboard seat groups 1L and 1R, seat backs and bottoms for all locations except B and I can be 16.5 inches wide. At locations B and I, the seat bottom also can be 16.5 inches wide, with the seat back center section being 7.5 inches wide, and each side section being 4.5 inches wide. For center seat group 1C, all seat backs and bottoms can be 19 inches wide.

Figure 27:
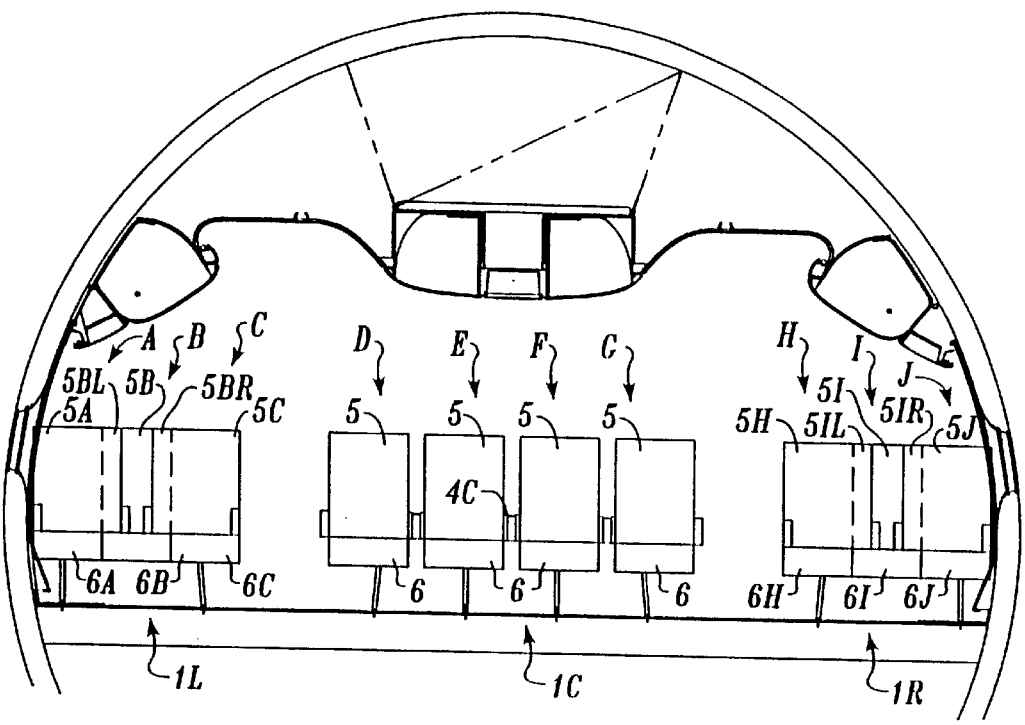
Figure 28:
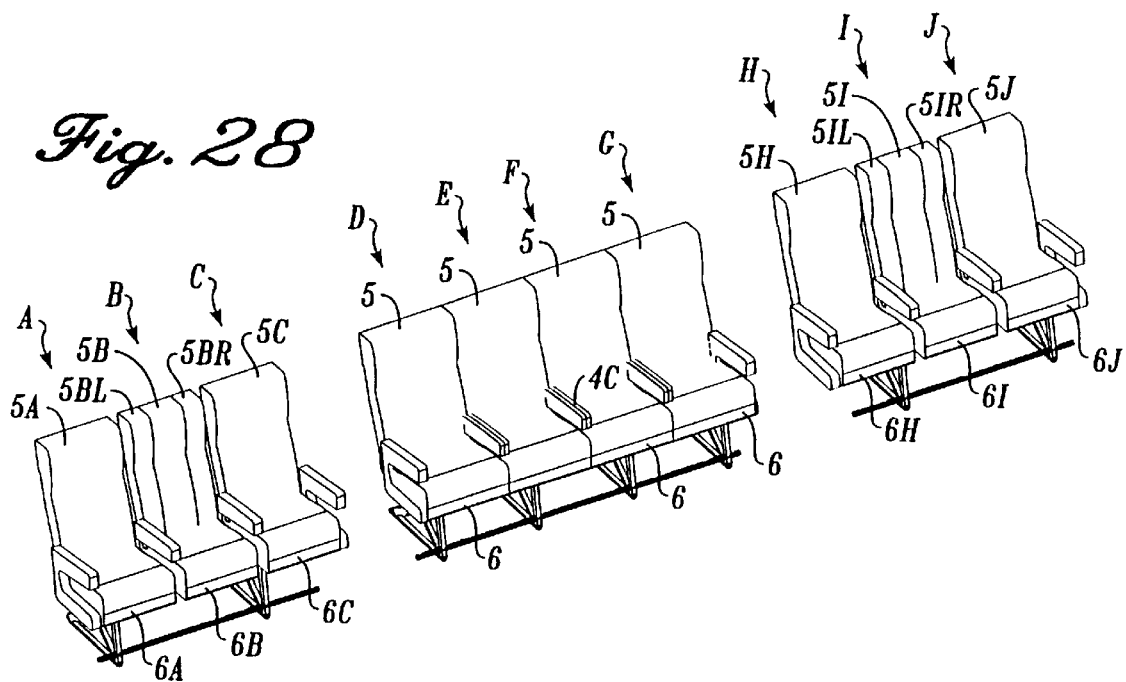
FIG. 28 is a top front perspective of the seat groups forming the ten abreast configuration of FIG. 26.
Figure 29:
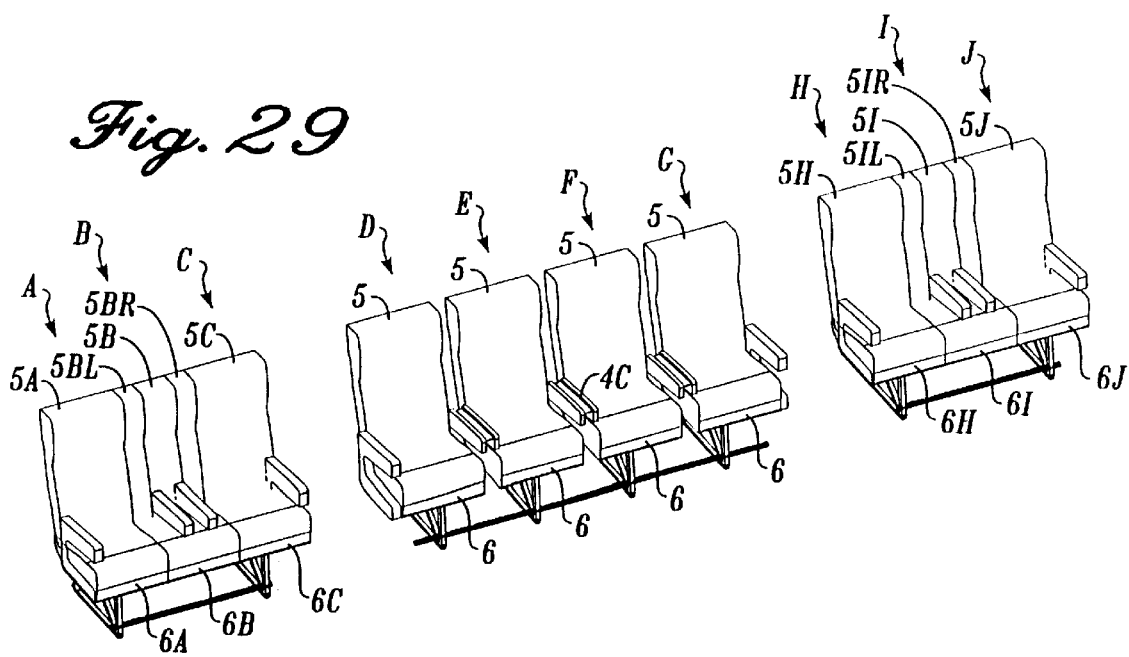
FIG. 29 is a top front perspective of the seat groups forming the eight abreast configuration of FIG. 27.
Figure 31:
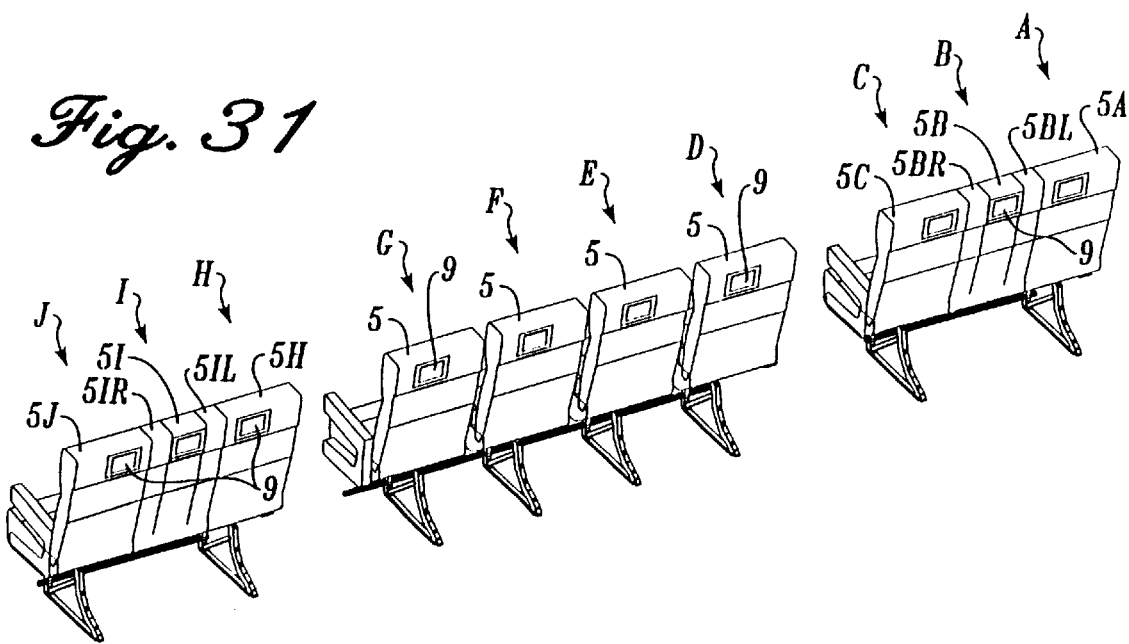
FIG. 31 is a top rear perspective of the seat groups forming the eight abreast configuration of FIGS. 27 and 29.

Conversion to the eight abreast 2/4/2 configuration of FIGS. 27, 29, and 31 requires that the center seat group 1C be expanded by outward translation of the seat backs and seat bottoms, outboard from the center armrest 4C. The intermediate arm rests, i.e., those not located on the aisle, can be of the expanding type described below with reference to FIGS. 46–49 or 50–53. Seat width increases to 19 inches, and the overall width of the center seat group increases to 92 inches. Each outboard seat group converts from a triple to a double, contracting to a total width of 49.5 inches. The narrow seat sections are coupled to the adjacent wider seat. More specifically, section 5BL is uncoupled from section 5B and coupled to seat back 5A; section 5BR is uncoupled from section 5B and coupled to section 5C; seat back section 5IL is uncoupled from section 5I and coupled to seat back 5H; and section 5IR is uncoupled from section 5I and coupled to seat back 5J. The center armrests of the outboard sections translate toward each other as shown in FIGS. 27 and 29, such that they are closely adjacent to the now nonfunctional seat backs 5B and 5I. Seat width for the two outboard locations at each side now is 19 inches.

Figure 30:
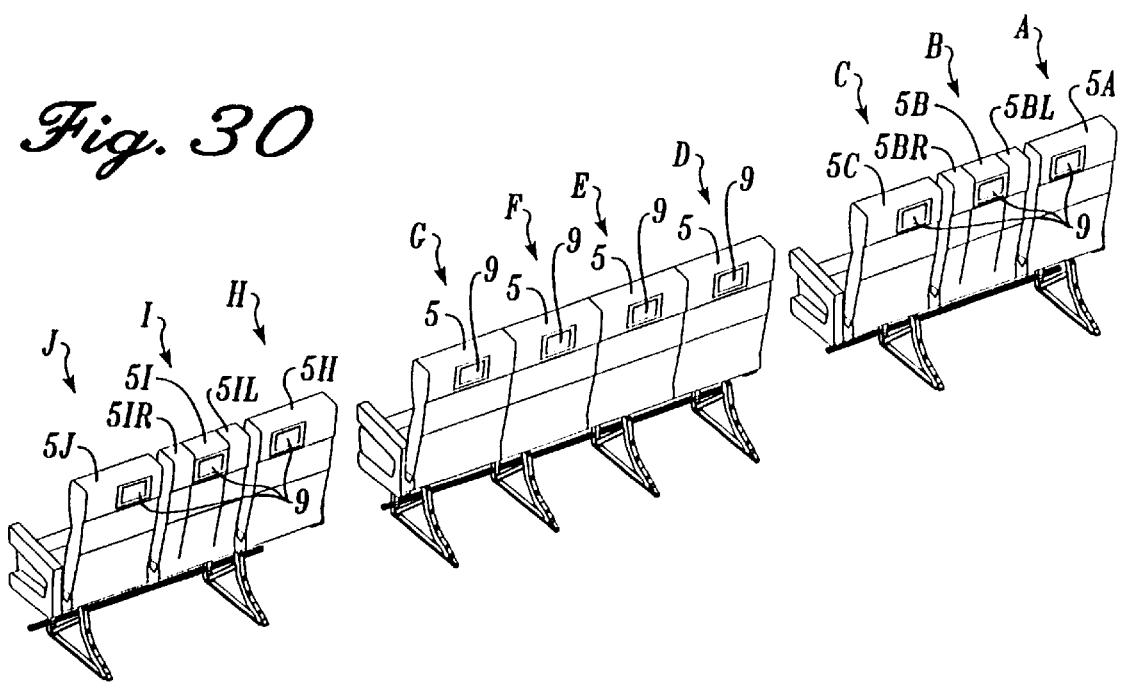
FIG. 30 is a top rear perspective of the seat groups forming the ten abreast configuration of FIGS. 26 and 28.

As seen in FIG. 30, in the ten abreast 3/4/3 configuration, there is an individual electronic display 9 associated with each of the ten seat locations. In the eight abreast 2/4/2 configuration (FIG. 31), the display units in seat sections 5B and 5I can be turned off.

FIGS. 32–34 show representative configurations for a Boeing 777-200 when convertible seats of the type shown in FIGS. 27–31 are used. In each instance, the forward first class compartment X has four rows of six abreast 2/2/2 seats. In the configuration of FIG. 32, the remaining part of the cabin is economy-tourist, with all seats being in ten abreast 3/4/3 configuration to location 32 where the fuselage tapers toward the tail. The eleven rows from location 34 to location 36 are provided with 34-inch pitch while the seats aft of location 36 are provided with a pitch of 31 to 32 inches. In the configuration of FIG. 33, the first three rows have been converted to eight abreast 2/4/2 business class seating. In the configuration of FIG. 34, ten rows have been converted to eight abreast 2/4/2 business class configuration (FIG. 34 shows the last center seat unit in the conversion zone unexpanded). Thus, the configuration of FIG. 32 has a capacity of 389 passengers (24 first class, 96 increased pitch economy, 269 standard pitch economy); the configuration of FIG. 33 provides a capacity of 383 passengers (24 first class, 24 business class, 66 increased pitch economy, 269 standard pitch economy); and the configuration of FIG. 34 has a capacity of 367 passengers (24 first class, 76 business class, 267 economy).

Figure 35:
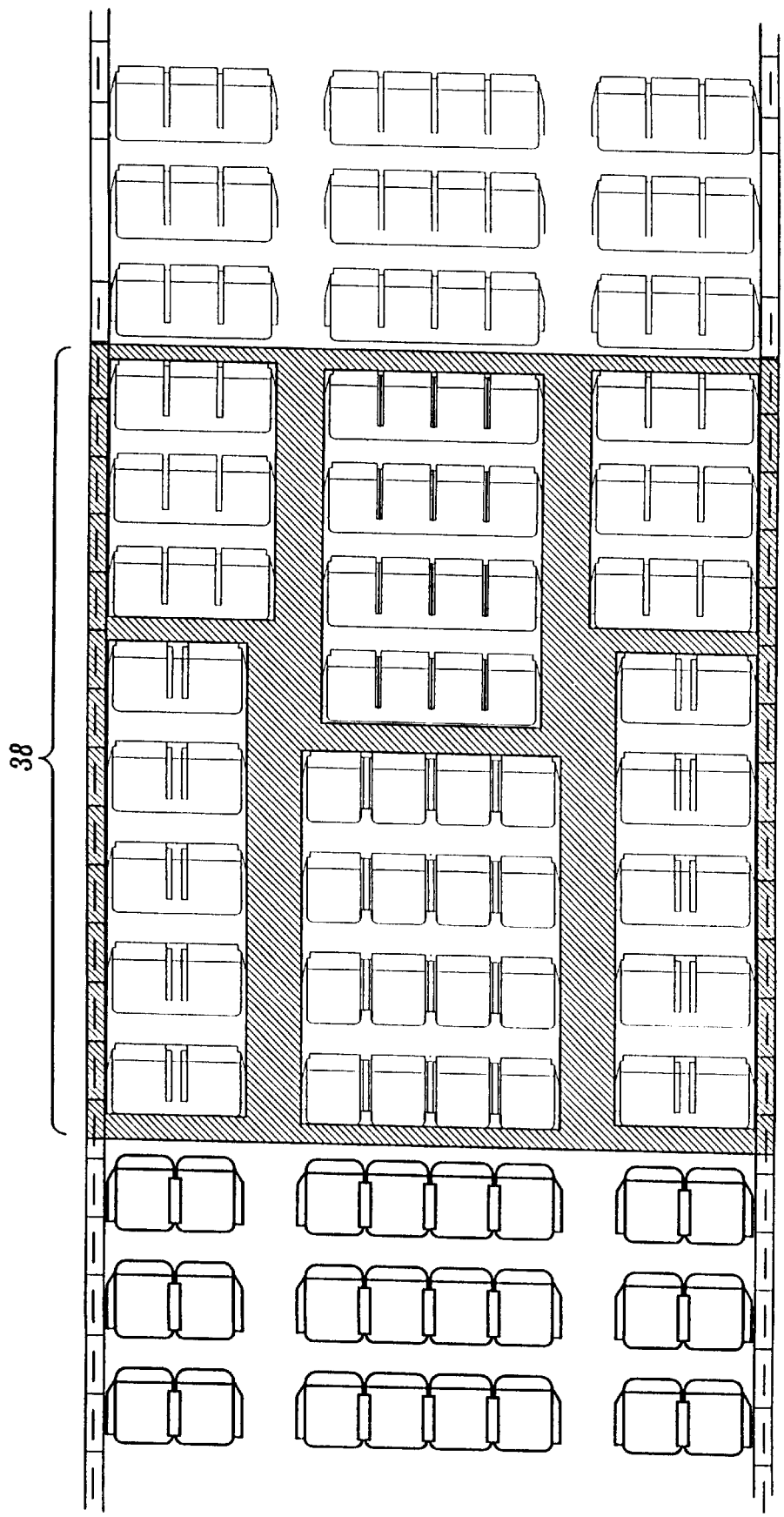
FIG. 35 is a diagrammatic top plan of a "conversion section" of an aircraft employing convertible seats in accordance with FIGS. 26–31.

FIG. 35 shows a modified conversion zone 38 having eight rows of seats of the type shown in FIGS. 26–31, the four forward rows being in the higher class eight abreast 2/4/2 configuration, the fifth row having the outboard seat units contracted for wider seats without expanding the center seat group, and the last three rows of the conversion zone being in the ten abreast 3/4/3 configuration. The fifth row is the "conversion row" and allows a smoother transition from the forward aisle width and position to the aft aisle width and position.

Figure 36:
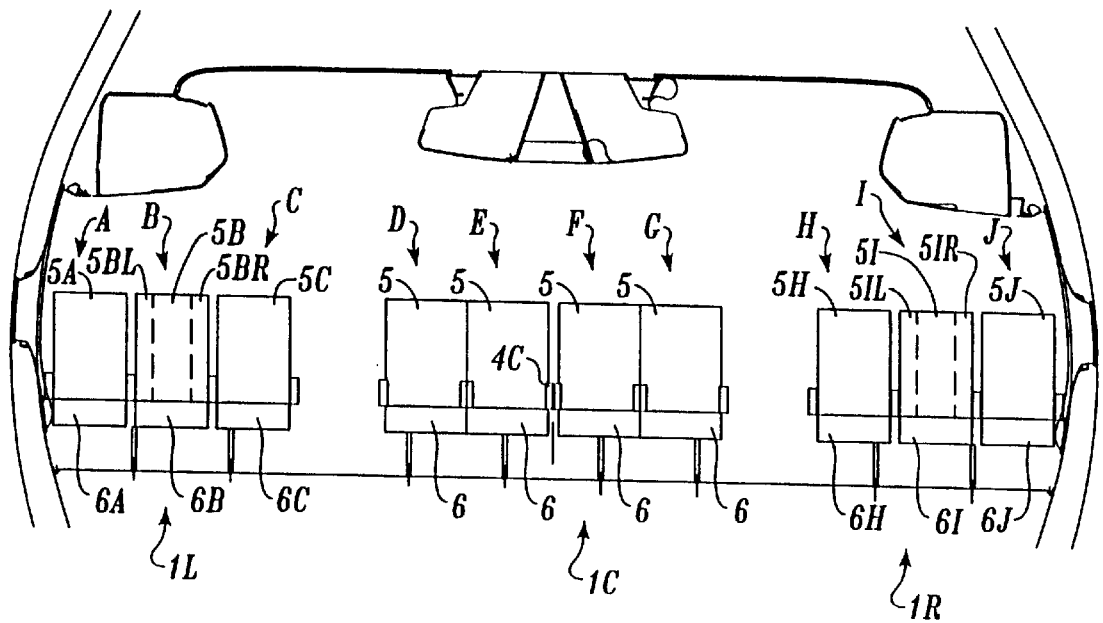
FIG. 36 and FIG. 37 are corresponding diagrammatic vertical sections through the passenger cabin of an aircraft having another convertible seat system in accordance with the present invention, FIG. 36 illustrating a ten abreast 3/4/3 configuration and FIG. 37 illustrating an eight abreast 2/4/2 configuration.
Figure 37:
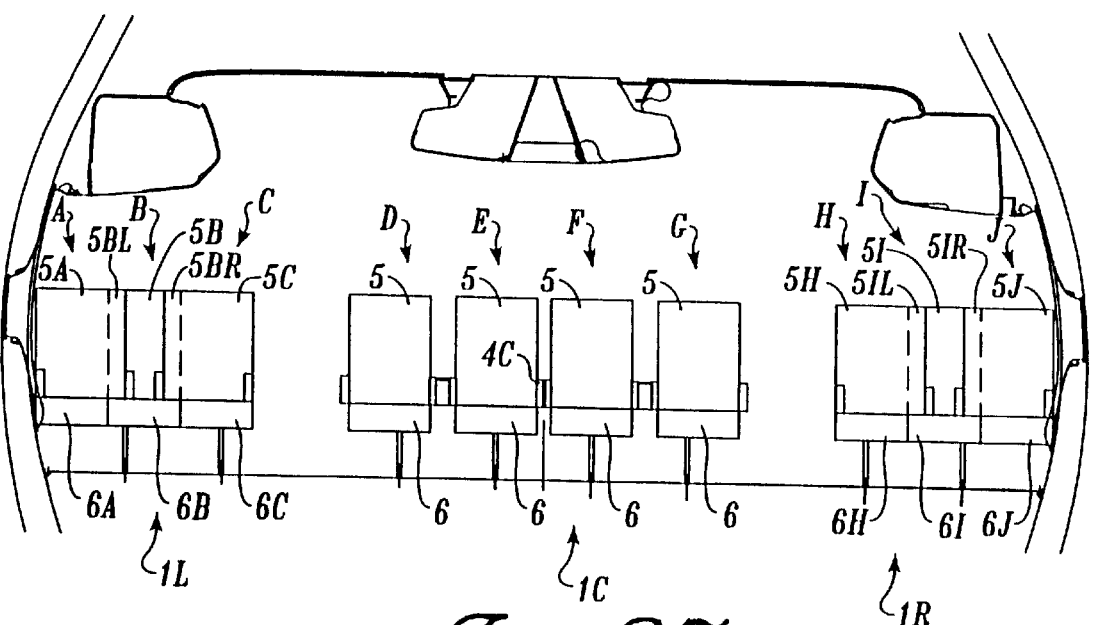

The embodiment of the present invention shown in FIGS. 36 and 37 is very similar to the embodiment shown in FIGS. 26–31. In each instance, outboard seat groups 1L and 1R are convertible from triples to doubles, all components being identical. The only difference is in the center seat group 1C which is expandable and contractible for adjusting seat width. Rather than providing an integrated center quad, two expandable-contractible doubles are placed side-by-side. Representative dimensions for the modified center group 1C of FIGS. 36 and 37 are 41 inches wide for each double contracted (17.2-inch seat width) and 47.75 inches expanded (19-inch seat width). Each seat back and seat bottom of the center unit can be about 19 inches wide, i.e., the seat backs and seat bottoms will closely abut the armrests in the expanded condition, as compared to being approximately aligned with the centers of the center armrests in the contracted condition. The center armrest 4C consists simply of two standard 1.5-inch armrests located side-by-side, regardless of whether the center seat group is expanded or contracted. The next most outboard armrests can be of the expanding type described below with reference to FIGS. 46–49 or 50–53.

Figure 38:
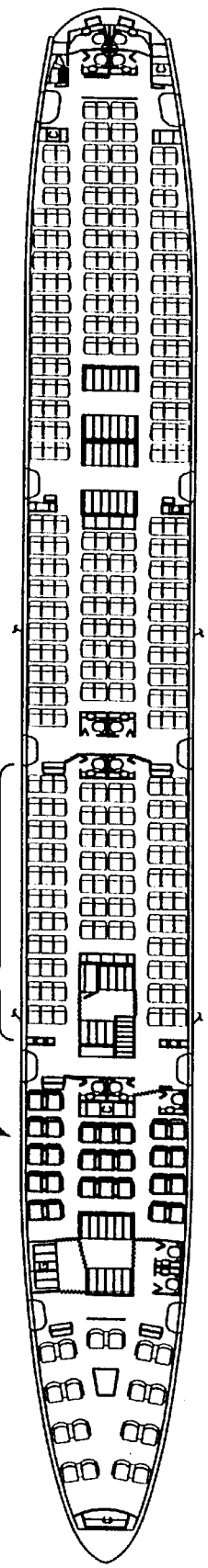
FIGS. 38–40 are corresponding top plans of the passenger cabin of an aircraft incorporating convertible seats of the type shown in FIGS. 36–37, FIG. 38 illustrating the convertible seats primarily in the ten abreast configuration, FIG. 39 illustrating the convertible seats partly in the ten abreast and partly in the eight abreast configuration, and FIG. 40 illustrating more of the convertible seats in the eight abreast configuration.
Figure 39:
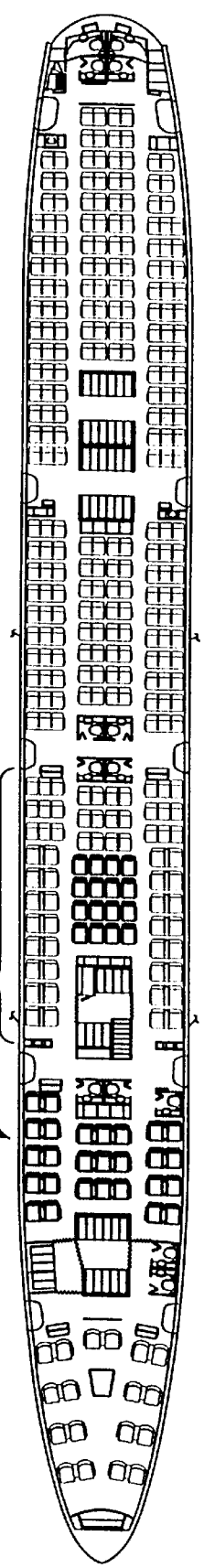
Figure 40:
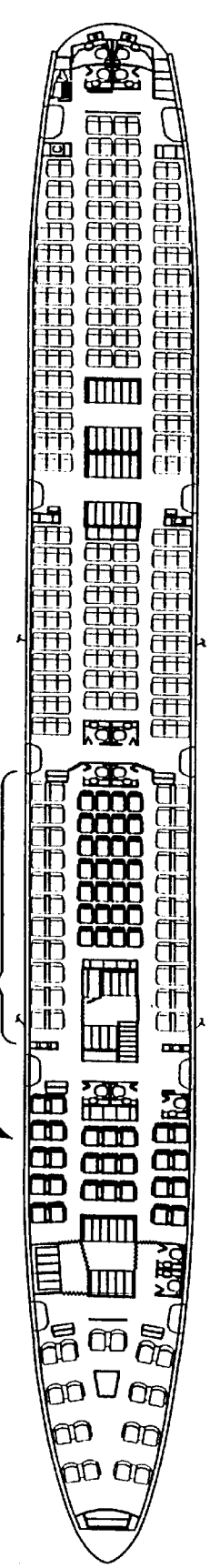

One application for convertible seats of the type shown in FIGS. 36 and 37 is for the lower passenger cabin of a Boeing 747 aircraft, for which representative configurations are shown in FIGS. 38, 39, and 40. In each figure, an eleven-row conversion zone 42 is provided, just aft of a business class compartment 44. In the configuration of FIG. 38 in which all outboard units in the conversion zone are triples and the center doubles are contracted, the seats would be sold as economy but with increased pitch, such as 34 inches. In the configuration of FIG. 39, the back three rows of the conversion zone remain in the ten abreast 3/4/3 configuration, but the other rows are converted to the roomier 2/4/2 configuration, and the forward outboard seat groups are contracted to wider doubles. In the configuration of FIG. 40, all seats in the conversion zone are made as wide as possible. Pricing can be adjusted accordingly, resulting in substantial additional revenues.

Figure 41:
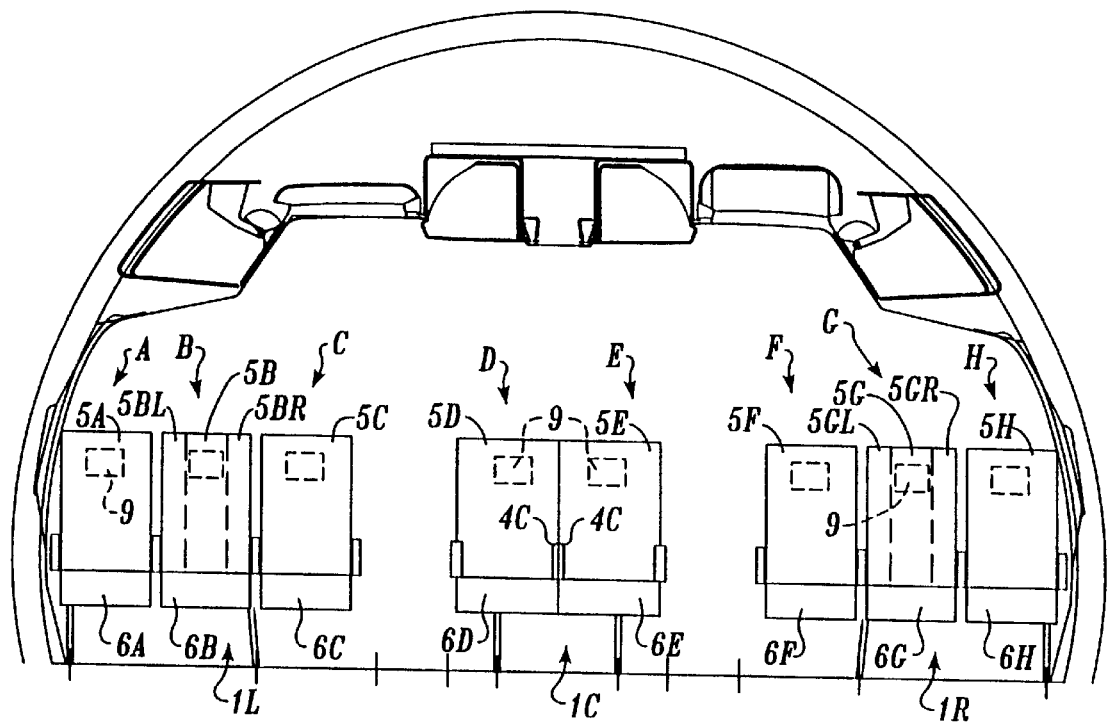
FIG. 41 and FIG. 42 are corresponding diagrammatic vertical sections through the passenger cabin of an aircraft having another convertible seat system in accordance with the present invention, FIG. 41 illustrating an eight abreast 3/2/3 configuration and FIG. 42 illustrating a six abreast 2/2/2 configuration.
Figure 42:
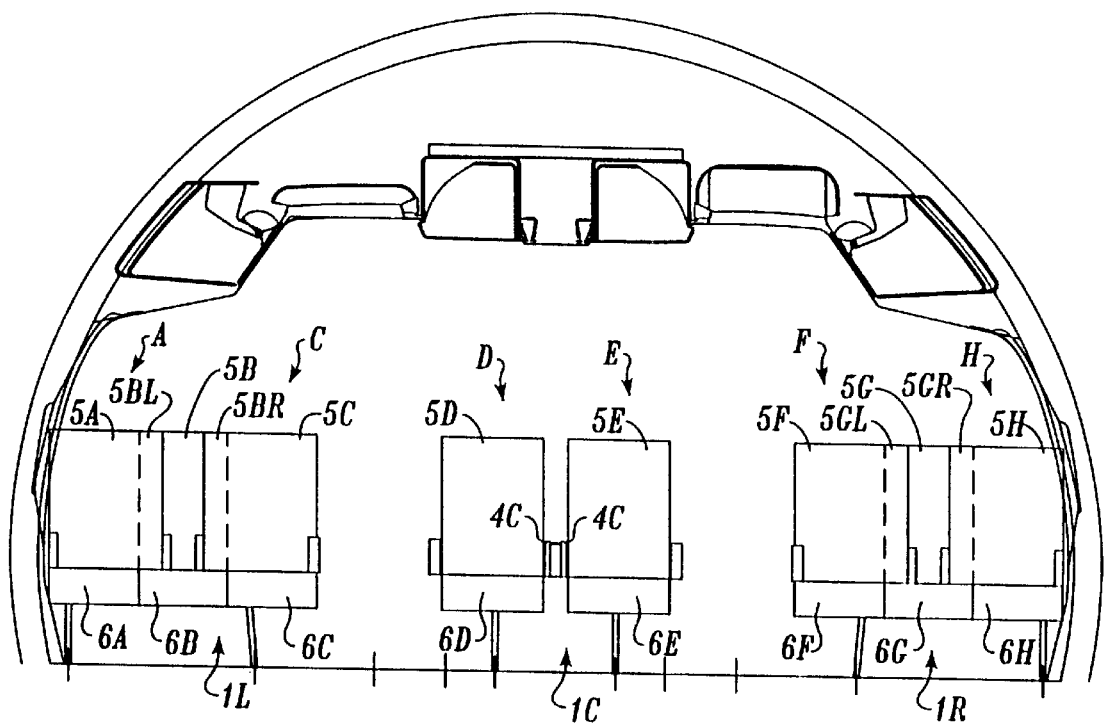

In the embodiment of the present invention shown in FIGS. 41 and 42, twin aisle seat groups are convertible from eight abreast 3/2/3 configuration to six abreast 2/2/2 configuration. A representative application for convertible seats of this type is a Boeing 767 aircraft. Referring to FIG. 41, the eight seat locations are identified as A–H. The outboard seat groups 1L and 1R convert from triples (FIG. 41) to doubles (FIG. 42) and, for the purpose of the present invention, are identical to the outboard groups described with reference to FIGS. 26–31. It should be noted that the outboard seat groups are adapted for individual electronic displays 9 in the seat back sections, even when in the eight abreast 3/2/3 configuration, unlike convertible seats currently in use. The center seat unit 1C consists of an expandable-contractible double which, for the purposes of the present invention, is similar to one component of the center seat unit described with reference to FIG. 36 and 37, except that this double seat group expands symmetrically about the center armrest 4C.

For a Boeing 767, representative dimensions for the embodiment of FIGS. 41 and 42 are as follows when in the eight abreast 3/2/3 configuration: width of outboard seat units, 56 inches; width of center seat unit, 39 inches; seat width 16.5 inches; aisle width 16.5 inches; width of armrest, 2 inches. In the more comfortable six abreast 2/2/2 configuration, the dimensions change to: width of outboard units, 49 inches; width of center unit, 46 inches; seat width 19 inches. Seat back and seat bottom dimensions can be as follows: for locations A, C, F, H, 17.5 inches; for locations B and G, seat bottom 17.5 inches; center seat back section 5B, 5G, 7.5 inches; narrow seat back sections (5BL, 5BR, 5GL, 5GR), 4.5 inches; for locations D and E, seat backs and bottoms 19 inches.

Figure 43:
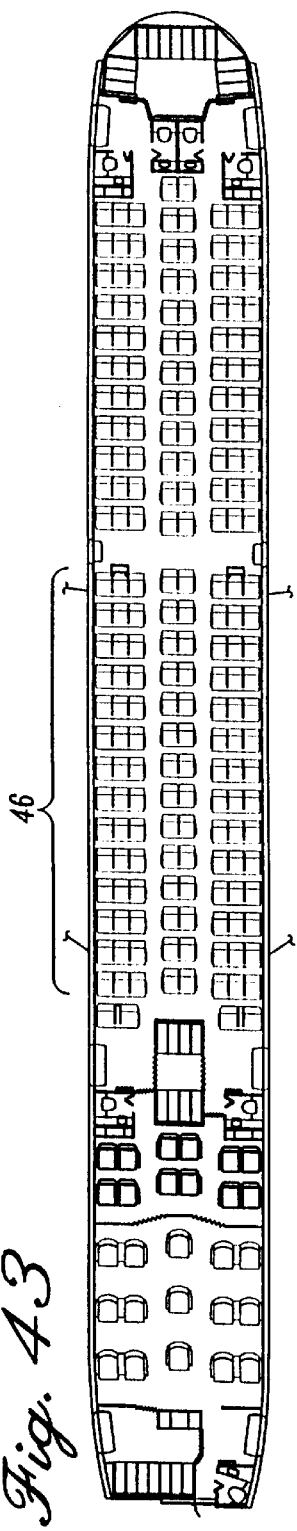
FIGS. 43–45 are corresponding top plans of the passenger cabin of an aircraft incorporating convertible seats of the type shown in FIGS. 41 and 42, FIG. 43 illustrating the convertible seats primarily in the eight abreast configuration, FIG. 44 illustrating the convertible seats partly in the eight abreast and partly in the six abreast configuration and FIG. 45 illustrating more of the convertible seats in the six abreast configuration.
Figure 44:
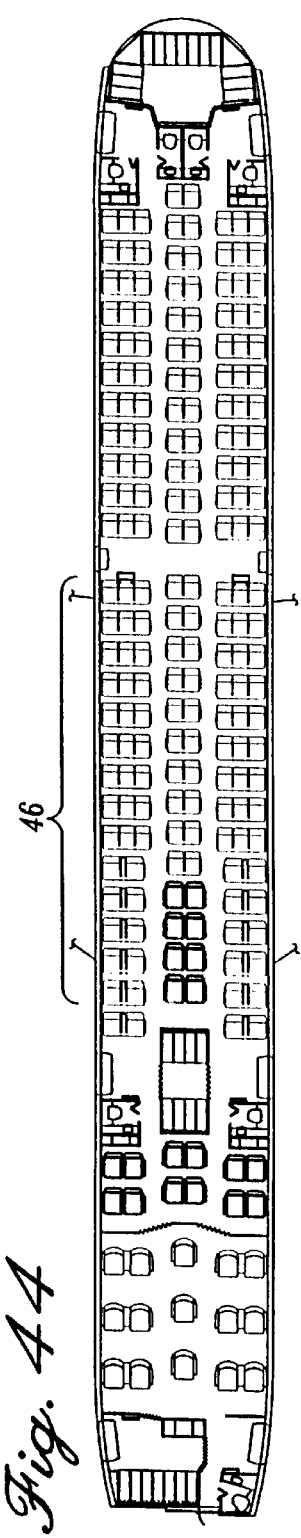
Figure 45:
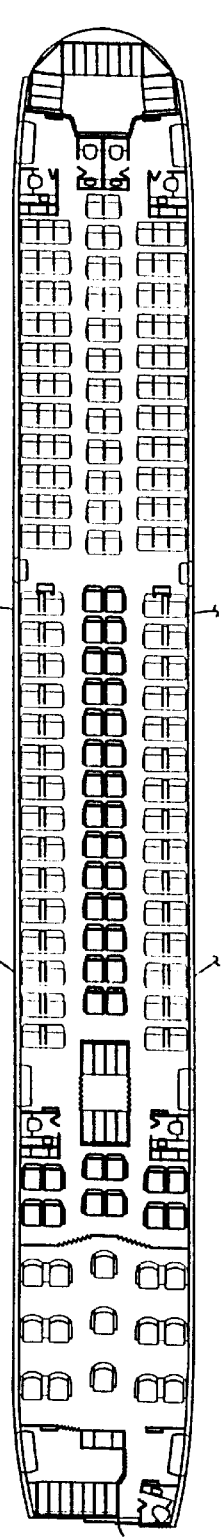
Figure 46:
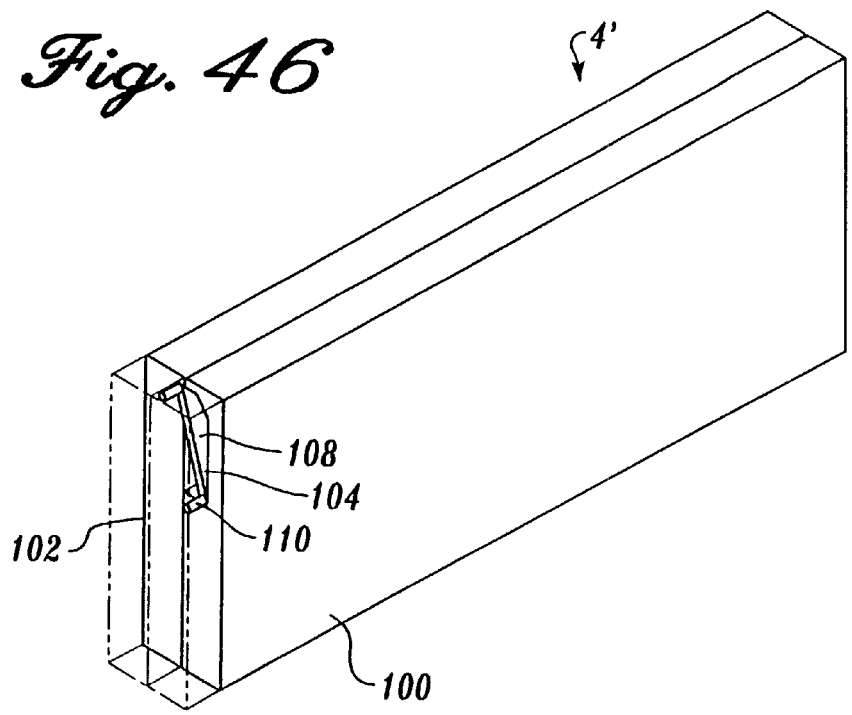
FIG. 46 and FIG. 47 are corresponding diagrammatic top perspectives of an expanding armrest usable in embodiments of a convertible seat system in accordance with the present invention, with parts in different positions.
Figure 47:
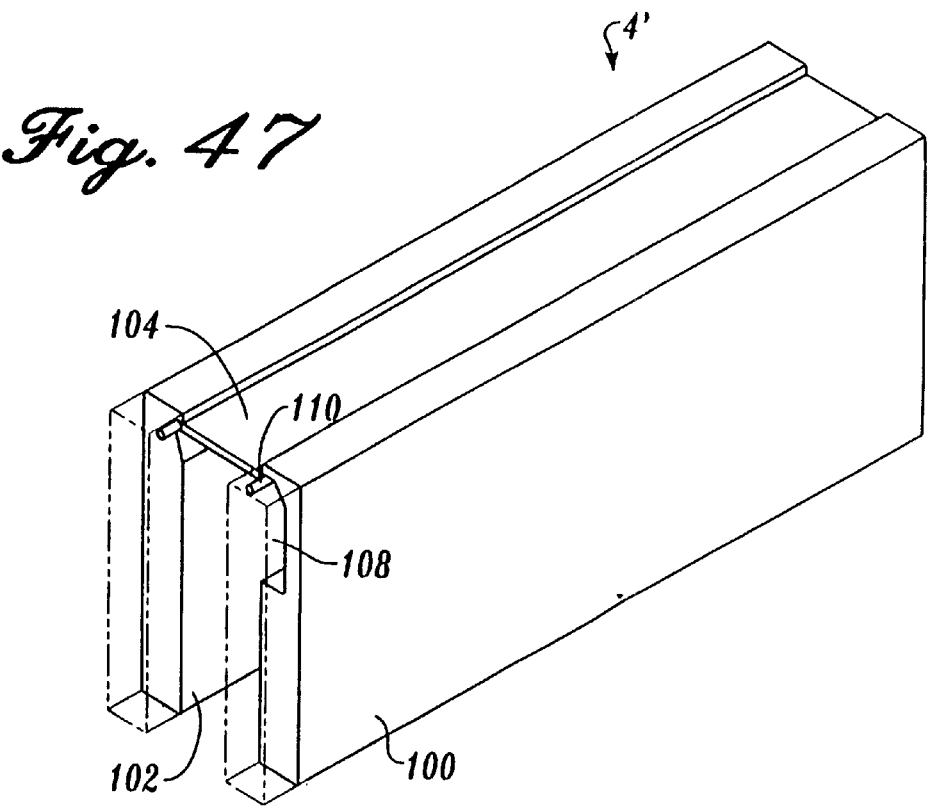
Figure 48:
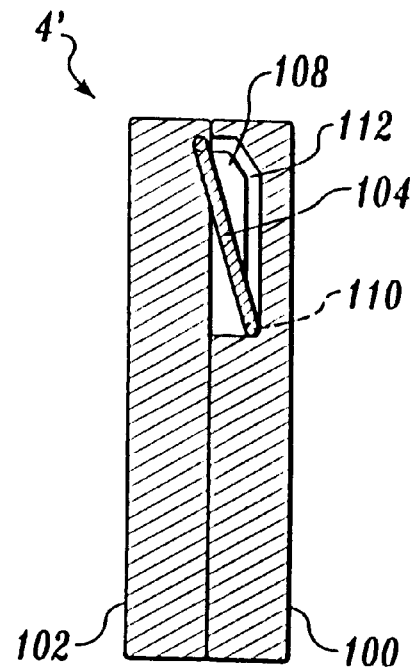
FIGS. 48 and 49 are corresponding diagrammatic end elevations thereof, with parts shown in section.
Figure 49:
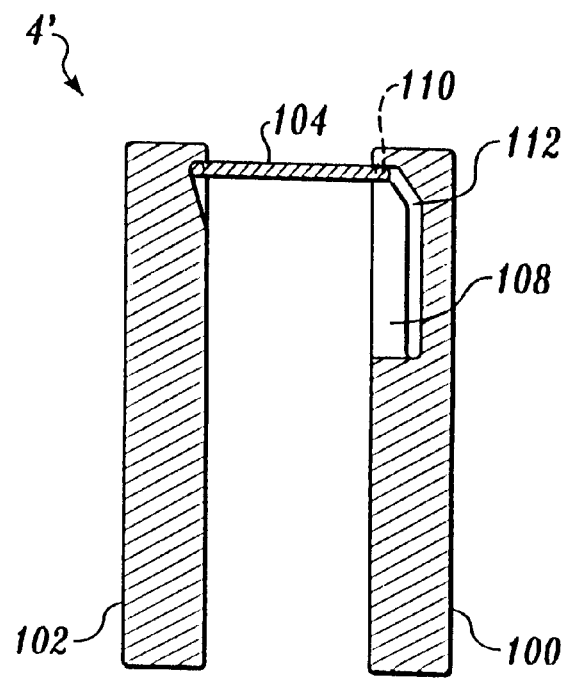

FIGS. 43, 44, and 45 show the effect on seating for a Boeing 767 when a central conversion zone 46 using seats of the type shown in FIGS. 41 and 42 are used. All rows can have 34-inch pitch. In the configuration of FIG. 43, the fourteen rows of convertible seats in the conversion zone 46 are in the eight abreast 3/2/3 configuration (discount economy but increased pitch) as compared to the configuration of FIG. 44 where some of the forward rows are in a "full fare economy" six abreast 2/2/2 configuration, and the configuration of FIG. 45 where all convertible seats are in the roomier six abreast 2/2/2 configuration.

Referring to the center double seat group 1C of FIGS. 41 and 42, when wider seats are created by simply expanding a seat group, some of the armrests, in this case the center armrests 4C, move apart. This is more comfortable for the passengers, but not as comfortable as having wider armrests of the type provided, for example, in fixed seat business class. Therefore, in accordance with the present invention, it is preferred that in these instances the armrests expand and include a center horizontal arm support, rather than merely two vertical components spaced apart. In the construction shown in FIGS. 46–49, armrest 4' has two upright side sections 100 and 102 that can translate relative to each other between the contracted position shown in FIGS. 46 and 48 and the expanded condition shown in FIGS. 47 and 49. The armrest includes a support plate 104 pivoted along one edge to upright 102. In the contracted position shown in FIGS. 46 and 48, the support 104 nests in a recess 108 of upright 100. Guide pins 110 project from one or both ends of the edge portion of support 104 opposite its point of pivotal connection to upright 102. Such pin(s) 110 rides in a groove 112 (FIGS. 48 and 49) forming a track to control the movement of the support 104 as the armrest uprights are moved toward and away from each other. From the contracted position shown in FIG. 46, translating movement of the uprights 100, 102 away from each other, such as during expansion of a seat group, automatically swings the support 104 to a horizontal position, forming a complete armrest, rather than two narrow armrests that are simply spaced apart. Similarly, when the seat group is contracted, the upright armrest portions 100, 102 are brought together, and the support 104 is automatically swung to the nested position shown in FIGS. 46 and 48. The construction of FIGS. 46–49 allows narrow armrest upright portions to be used, 1 inch wide or less, but expands to a much wider composite armrest, 6 inches wide or more.

Figure 50:
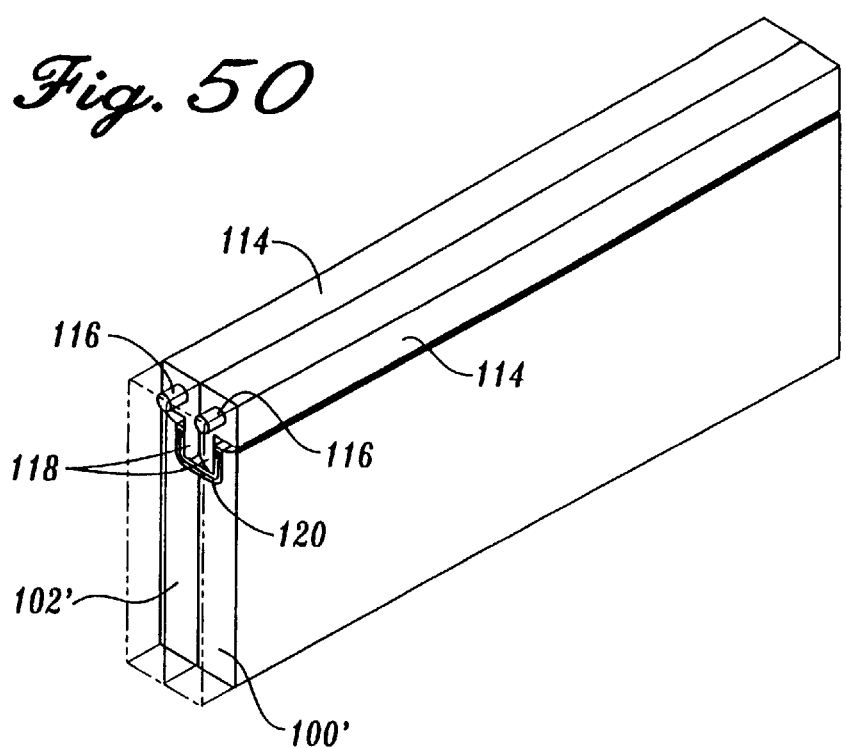
FIG. 50 and FIG. 51 are corresponding diagrammatic top perspectives of an alternative form of an expanding armrest usable in embodiments of a convertible seat system in accordance with the present invention, with parts in different positions.
Figure 51:
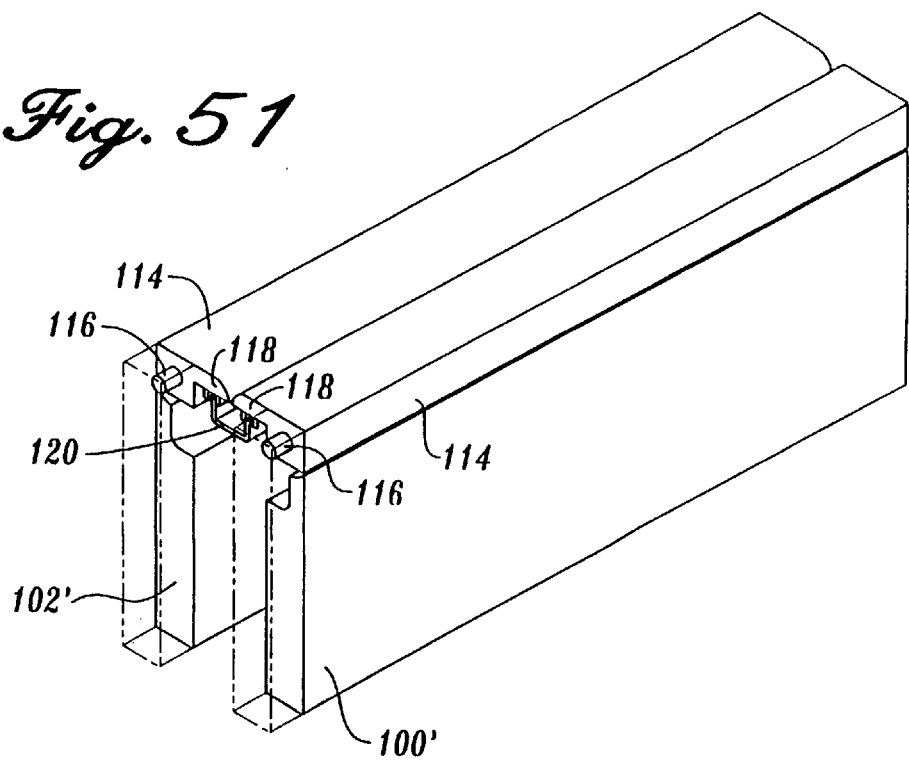
Figure 52:
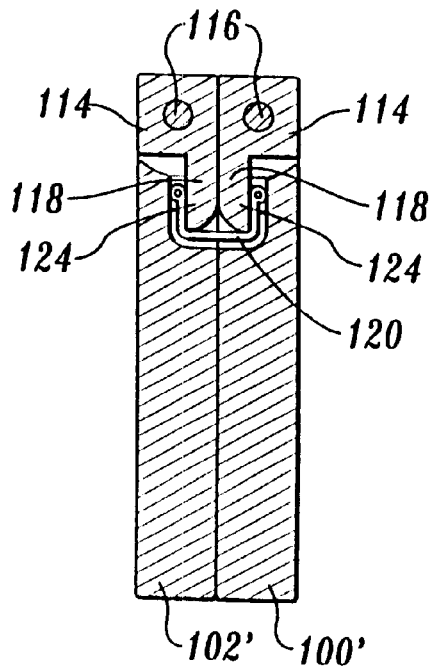
FIGS. 52 and 53 are corresponding diagrammatic end elevations thereof, with parts shown in section.
Figure 53:
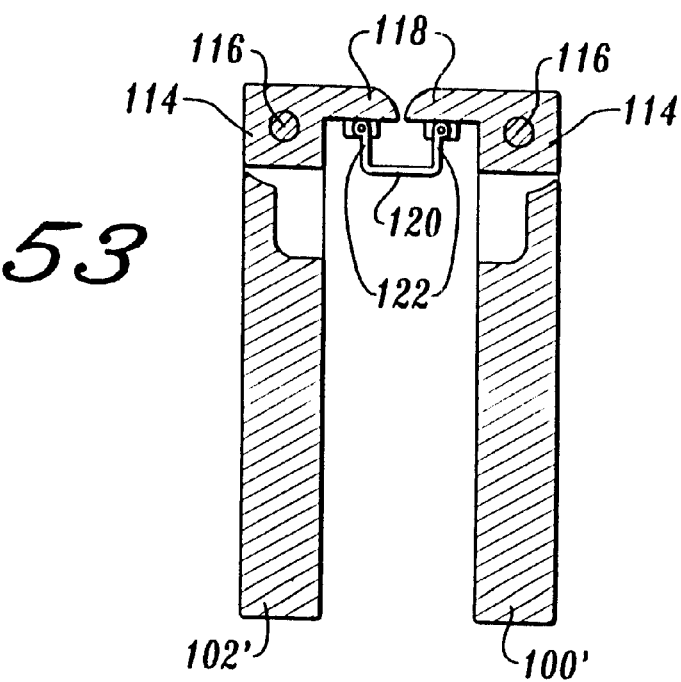

The alternative construction shown in FIGS. 50–53 also uses upright armrest portions 100', 102' which translate relative to each other between a compact contracted condition shown in FIGS. 50 and 52 and an expanded condition shown in FIGS. 51 and 53. In the expanded condition, the upright portions are spaced apart, but a horizontal arm support is formed between them. As best seen in FIGS. 52 and 53, each upright 100', 102' has an armrest component 114. Each component 114 is pivotally mounted on the upper end portion of its upright 100' or 102', such as by a pivot pin 116. Components 114 include flanges 118, which, in the contracted condition shown in FIG. 52, extend generally downward from their pivots 116 and abut along the facing surfaces of the uprights. When the uprights are translated apart, however, the flanges 118 are swung inward toward each other until they reach the position shown in FIG. 53 in which they extend horizontally inward and have their inner edges closely adjacent. A U-shaped link 120 has its opposite ends 122 pivoted to the undersides of the adjacent flanges 118. This limits the extent to which the uprights 100', 102' can be spread apart and, when the uprights are locked in position, provides a sturdy support for the horizontal arm support flanges. In the nested condition shown in FIG. 52, the nose portions 124 of the flanges fit within the U-shaped link.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A seat system for an aircraft passenger cabin having a floor, said seat system comprising a seat group having a frame for anchoring to the floor and armrest components and seat backs and seat bottoms for translating relative to the frame between an expanded condition defining five seat locations of a first given width and a contracted condition defining four seat locations of a second given width greater than the first given width, the overall width of the seat group being greater in the expanded condition than in the contracted condition, the seat group being convertible between the expanded condition and the contracted condition without separation of any of the armrest components, seat backs or seat bottoms from the frame.

2. The seat system defined in claim 1, in which the seat group includes six armrest components spaced apart to define the five seat locations in the expanded condition of the seat group, each of said five seat locations having a first width defined by the space between adjacent armrest components, and in which in the contracted condition of the seat group the four seat locations are defined by the spaces between four pairs of the armrest components, two of the armrest components being located much closer together than said pairs of armrest components in the contracted condition, the four seat locations of the seat group in the contracted condition being wider than the five seat locations of the seat group in the expanded condition.

3. The seat system defined in claim 2, in which at least one of the armrest components includes two upright side sections mounted for translation relative to each other between a contracted condition in which the upright sections are located close together and an expanded condition in which the upright sections are located farther apart, and a support member connected to the upright sections so as to be disposed generally upright between the armrest sections when contracted but extend horizontally between them when the upright sections are expanded.

4. The seat system defined in claim 1, in which, in the expanded condition of the seat group, the seat locations include two outboard locations each having a unitary seat back and three inboard seat locations each having a seat back formed of a plurality of side-by-side sections coupled together.

5. The seat system defined in claim 4, in which, in the expanded condition of the seat group, two of the three inboard seat locations have seat backs formed of two side-by-side sections coupled together and the other of the three inboard seat locations has a seat back formed of three side-by-side sections coupled together.

6. The seat system defined in claim 5, in which, in the contracted condition of the seat group, the seat locations include two outboard locations each having a seat back formed of a plurality of side-by-side sections coupled together and two inboard seat locations each having a seat back formed of a plurality of side-by-side sections coupled together.

7. The seat system defined in claim 4, in which each of two of the three inboard seat backs includes a narrow outboard seat back section and a wider inboard seat back section, the narrow seat back sections being coupled to the wider inboard sections in the expanded condition of the seat group but being coupled to the outboard seat backs in the contracted condition of the seat group.

8. A seat system for an aircraft passenger cabin having a floor, said seat system comprising a transversely extending row having a left seat group and a right seat group, the left and right seat groups each being convertible between a contracted condition defining a plurality of seat locations of a first given width and an expanded condition defining a plurality of seat locations of a second given width that is wider than the first given width, and a center seat group convertible between an expanded condition defining five seat locations of a third given width and a contracted condition defining four seat locations of a fourth given width that is wider than the third given width, such that the row is convertible between a first configuration with the outboard seat groups contracted and the center seat group expanded and a second configuration with the outboard seat groups expanded and the center seat group contracted, the overall width of each seat group being greater in the expanded condition than in the contracted condition, each seat group having a flame for anchoring to the floor, and armrests, seat backs and seat bottoms movable along the frame between the expanded and contracted condition of the seat group without separation from the frame and without adjustment of the anchoring of the frame to the floor.

9. The seat system defined in claim 8, in which each of the left seat group and the right seat group is a double, such that the row of seats is convertible between a nine abreast 2/5/2 first configuration with the outboard seat groups contracted and the inboard seat group expanded and an eight abreast 2/4/2 second configuration with the outboard seat groups expanded and the center seat group contracted.

10. The seat system defined in claim 8, in which at least one of the seat groups has an adjustable armrest including two upright side sections mounted for translation relative to each other between a contracted condition in which the upright sections are located close together and an expanded condition in which the upright sections are located farther apart, and a support member connected to the upright sections so as to be disposed generally upright between the armrest sections when contracted but so as to extend horizontally between the armrest sections when the upright sections are expanded.

11. The seat system defined in claim 8, in which each of the right, left and center seat groups has at least one adjustable arm rest including two upright side sections mounted for translation relative to each other between a contracted condition in which the upright sections are located close together and an expanded condition in which the upright sections are located farther apart, and a support member connected to the upright sections so as to be disposed generally upright between the armrest sections when contracted but so as to extend horizontally between the armrest sections when the upright sections are expanded.

12. The seat system defined in claim 8, in which the center seat group includes six armrests spaced substantially equally apart in the expanded condition, but spaced irregularly in the contracted condition to define four first pairs of substantially equally spaced adjacent armrests and one additional pair of adjacent armrests located much closer together than the armrests of said four first pairs.

13. The seat system defined in claim 8, in which the row includes aisles between the left seat group and the center seat group, and the center seat group and the right seat group, respectively, and in which the aisle width is greater in the second configuration than in the first configuration.

14. A seat system for an aircraft passenger cabin having a floor, said seat system comprising a seat group having a frame for anchoring to the floor and armrest components and seat backs and seat bottoms for translating relative to the frame between an expanded condition defining five seat locations and a contracted condition defining four seat locations, the seat locations including two outboard seat locations and three inboard seat locations, and in which, in the expanded condition of the seat group, two of the three inboard seat locations has a seat back formed of two side-by-side sections coupled together and the other of the three inboard seat locations has a seat back formed of three side-by-side sections coupled together.

15. The seat system defined in claim 14, in which the seat group is convertible between the expanded condition and the contracted condition without separation of any of the armrest components, seat backs or seat bottoms from the frame.

16. The seat system defined in claim 15, in which, in the expanded condition of the seat group, the outboard seat locations each have a unitary seat back.

17. The seat system defined in claim 15, in which at least one of the armrest components is an adjustable armrest including two upright side sections mounted for translation relative to each other between a contracted condition in which the upright sections are located close together and an expanded condition in which the upright sections are located farther apart, and a support member connected to the upright sections so as to be disposed generally upright between the armrest sections when contracted but so as to extend horizontally between the armrest sections when the upright sections are expanded.

18. A seat system for an aircraft passenger cabin having a floor, said seat system comprising a seat group having a frame for anchoring to the floor and armrest components and seat backs and seat bottoms for translating relative to the frame between an expanded condition defining five seat locations including three inboard seat locations and two outboard seat locations and a contracted condition defining four seat locations including two inboard seat locations and two outboard seat locations, the overall width of the seat group being greater in the expanded condition than in the contracted condition, in which, in the expanded condition of the seat group, one of the inboard seat locations has a seat back formed of three side-by-side sections coupled together which sections are not coupled together when the seat group is in the contracted condition.

19. A seat system for an aircraft passenger cabin having a floor, said seat system comprising a seat group having a frame for anchoring to the floor and armrest components and seat backs and seat bottoms for translating relative to the frame between an expanded condition defining a plurality of seat locations of a first given width and a contracted condition defining a plurality of seat locations defining a second given width different from the first given width, the armrest components including an adjustable armrest located between two of the seat locations in each of the expanded and contracted conditions and having two upright side sections mounted for translation relative to each other between a contracted condition in which the upright sections are located close together and an expanded condition in which the upright sections are located farther apart, and a support member connected to the upright sections so as to be disposed generally upright and nested between the armrest sections when contracted but so as to extend horizontally between the armrest sections when the upright sections are expanded.

20. An armrest component for a seat system for an aircraft passenger cabin comprising two upright side sections mounted for translation relative to each other between a contracted condition in which the upright sections are located close together and an expanded condition in which the upright sections are located farther apart, and a support member connected to the upright sections so as to be disposed generally upright and nested between the armrest sections when contracted but extend horizontally between them when the upright sections are expanded.

* * * * *